US011405407B2

(12) United States Patent
Xiao et al.

(10) Patent No.: US 11,405,407 B2
(45) Date of Patent: Aug. 2, 2022

(54) DATA PACKET SENDING METHOD, NETWORK DEVICE, CONTROL DEVICE, AND NETWORK SYSTEM

(71) Applicant: Huawei Technologies Co., Ltd., Shenzhen (CN)

(72) Inventors: Qian Xiao, Shenzhen (CN); Yuming Xie, Nanjing (CN); Jun Wu, Nanjing (CN); Liang Zhang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 349 days.

(21) Appl. No.: 16/692,616

(22) Filed: Nov. 22, 2019

(65) Prior Publication Data
US 2020/0092302 A1 Mar. 19, 2020

Related U.S. Application Data

(63) Continuation of application No. PCT/CN2018/084849, filed on Apr. 27, 2018.

(30) Foreign Application Priority Data

May 25, 2017 (CN) .......................... 201710381240.4

(51) Int. Cl.
*G06F 9/00* (2006.01)
*G06F 15/16* (2006.01)
(Continued)

(52) U.S. Cl.
CPC ........ *H04L 63/123* (2013.01); *H04L 43/0847* (2013.01); *H04L 63/0209* (2013.01);
(Continued)

(58) Field of Classification Search
CPC .............. H04L 63/123; H04L 43/0847; H04L 63/0209; H04L 63/126; H04L 63/1441;
(Continued)

(56) References Cited

U.S. PATENT DOCUMENTS

| 8,843,598 B2 | 9/2014 | Singhal et al. |
| 2006/0126495 A1 | 6/2006 | Guichard et al. |

(Continued)

FOREIGN PATENT DOCUMENTS

| CN | 101036330 A | 9/2007 |
| CN | 101227348 A | 7/2008 |

(Continued)

OTHER PUBLICATIONS

Naous et al., Verifying and enforcing network paths with Icing, 2011. (Year: 2011).*

(Continued)

*Primary Examiner* — Trong H Nguyen
(74) *Attorney, Agent, or Firm* — Conley Rose, P.C.

(57) ABSTRACT

A data packet sending method, a network device, a control device, and a network system includes receiving a first data packet sent by a first device, where a packet header of the first data packet includes a first sequence number marker sequence, a first position marker sequence, a first accumulated value, and a verification value; obtaining a second data packet, where a packet header of the second data packet includes a second sequence number marker sequence, a second position marker sequence, a second accumulated value, and the verification value; and sending the second data packet to a second device.

19 Claims, 4 Drawing Sheets

(51) Int. Cl.
*G06F 17/00* (2019.01)
*H04L 9/40* (2022.01)
*H04L 43/0823* (2022.01)
*H04L 69/22* (2022.01)

(52) U.S. Cl.
CPC ........ *H04L 63/126* (2013.01); *H04L 63/1441* (2013.01); *H04L 63/164* (2013.01); *H04L 69/22* (2013.01)

(58) Field of Classification Search
CPC ....... H04L 63/164; H04L 69/22; H04L 29/06; H04L 63/0428; H04L 63/12; H04L 63/1416
See application file for complete search history.

(56) References Cited

U.S. PATENT DOCUMENTS

| | | | |
|---|---|---|---|
| 2014/0198791 | A1* | 7/2014 | Lim ...................... H04L 63/123 370/392 |
| 2016/0315819 | A1 | 10/2016 | Dara et al. |
| 2016/0315921 | A1* | 10/2016 | Dara ..................... H04L 69/166 |

FOREIGN PATENT DOCUMENTS

| | | |
|---|---|---|
| CN | 101997681 A | 3/2011 |
| CN | 105847034 A | 8/2016 |

OTHER PUBLICATIONS

Naous, J., "Verifying and enforcing network paths with Icing," ACM CoNEXT 2011, Dec. 6-9, 2011, 12 pages.

* cited by examiner

DATA PACKET SENDING METHOD, NETWORK DEVICE, CONTROL DEVICE, AND NETWORK SYSTEM

CROSS-REFERENCE TO RELATED APPLICATIONS

This application is a continuation application of International Application No. PCT/CN2018/084849, filed on Apr. 27, 2018, which claims priority to Chinese Patent Application No. 201710381240.4, filed on May 25, 2017. The disclosures of the aforementioned applications are hereby incorporated by reference in their entireties.

TECHNICAL FIELD

This application relates to the communications field, and in particular, to a data packet sending method, a network device, a control device, and a network system.

BACKGROUND

Path verification may include performing verification on nodes through which a data packet passes and an order of passing through the nodes. The path verification may be used to reduce risks such as a distributed denial-of-service (DDoS) attack, a flow redirection attack, and a source address spoofing attack, and also helps to find a network policy configuration error in time.

Jad Naous et al. disclose a path verification method ICING based on an encryption algorithm (refer to "Verifying and enforcing network paths with ICING", ACM CoNEXT 2011, digital object identifier (DOI): 10.1145/2079296.2079326). Each intermediate node on a transmission path in ICING performs verification on a previous node using an identifier of the previous node and a pairing key configured on the intermediate node. In ICING, each intermediate node needs to support encryption and decryption, and consequently a computing load is relatively high.

SUMMARY

This application provides a data packet sending method, a network device, a control device, and a network system, so as to reduce a computing load of an intermediate network device during path verification.

According to a first aspect, a data packet sending method is provided. The method is applied to a network device, and the network device is one of a plurality of intermediate network devices on a path. A data packet is sent to a verification device for path verification after being transferred through the path. The method includes receiving, by the network device, a first data packet sent by a first device, where a packet header of the first data packet includes a first sequence number marker sequence, a first position marker sequence, a first accumulated value, and a verification value, where the first sequence number marker sequence includes a plurality of sequence number markers arranged in order, a first sequence number marker to a last sequence number marker in the first sequence number marker sequence respectively record whether a first sequence number to a last sequence number in an available sequence number sequence are marked, sequence numbers in the available sequence number sequence are arranged in order, and the sequence numbers in the available sequence number sequence include sequence numbers of the plurality of intermediate network devices; the first position marker sequence includes a plurality of position markers arranged in order, a first position marker to a last position marker in the first position marker sequence respectively record whether a first sequence number to a last sequence number in a position sequence number sequence are marked, the position sequence number sequence includes the sequence numbers of the plurality of intermediate network devices and a sequence number of a pseudo device, the sequence numbers of the plurality of intermediate network devices are arranged in the position sequence number sequence in an order of the plurality of intermediate network devices on the path in a sending direction of the first data packet, and the first position marker sequence records that the sequence number of the pseudo device is marked; and the verification value is used by the verification device to perform path verification; obtaining, by the network device, a second data packet, where a packet header of the second data packet includes a second sequence number marker sequence, a second position marker sequence, a second accumulated value, and the verification value, where the second accumulated value is obtained based on the first sequence number marker sequence, the first position marker sequence, and the first accumulated value, the second sequence number marker sequence is obtained by recording, in the first sequence number marker sequence, that a sequence number of the network device is marked, and the second position marker sequence is obtained by recording, in the first position marker sequence, that the sequence number of the network device is marked; and sending, by the network device, the second data packet to a second device.

According to the method provided in the first aspect, verification may be performed on an order in which a data packet passes through intermediate network devices on the path, and the intermediate network devices do not need to perform encryption/decryption processing, so as to reduce a computing load of the intermediate network devices. The position sequence number sequence includes the sequence number of the pseudo device, so as to prevent a retransmission attack.

Optionally, the sequence numbers in the available sequence number sequence are arranged in ascending order, and the network device obtains the second accumulated value based on the first sequence number marker sequence, the first position marker sequence, and the first accumulated value using the following formula.

$$c_k = (c_m + p \times (n-a)!) \% \mu,$$

where $c_k$ is the second accumulated value, $c_m$ is the first accumulated value, p is a quantity of sequence number markers that are before a current sequence number marker in the first sequence number marker sequence and that record that sequence numbers in the available sequence number sequence are not marked, where the current sequence number marker is a sequence number marker that is in the first sequence number marker sequence that records whether the sequence number of the network device is marked, n is a length of the first position marker sequence, a is a sorting value of a current position marker in the first position marker sequence, the current position marker is a first position marker that is in the first position marker sequence and that records that a sequence number in the position sequence number sequence is not marked, and $\mu$ is a modulo prime number. In this solution, the modulo prime number is used for accumulated value calculation, so as to prevent a retransmission attack.

According to a second aspect, a data packet sending method is provided. The method is applied to a control device, the control device communicates with a verification device through a path, and the path includes a plurality of intermediate network devices. The method includes obtaining, by the control device, a sequence number marker sequence and a position marker sequence, where the sequence number marker sequence includes a plurality of sequence number markers arranged in order, a first sequence number marker to a last sequence number marker in the sequence number marker sequence respectively record whether a first sequence number to a last sequence number in an available sequence number sequence are marked, sequence numbers in the available sequence number sequence are arranged in order, and the sequence numbers in the available sequence number sequence include sequence numbers of the plurality of intermediate network devices; and the position marker sequence includes a plurality of position markers arranged in order, a first position marker to a last position marker in the position marker sequence respectively record whether a first sequence number to a last sequence number in a position sequence number sequence are marked, the position sequence number sequence includes the sequence numbers of the plurality of intermediate network devices and a sequence number of a pseudo device, the sequence numbers of the plurality of intermediate network devices are arranged in the position sequence number sequence in an order of the plurality of intermediate network devices on the path in a direction from the control device to the verification device, and the position marker sequence records that the sequence number of the pseudo device is marked; obtaining, by the control device, an accumulated value of the sequence number of the pseudo device and a verification value based on the position sequence number sequence; and sending, by the control device, a data packet to a network device, where the network device is a first intermediate network device of the plurality of intermediate network devices on the path in the direction from the control device to the verification device, a packet header of the data packet includes the sequence number marker sequence, the position marker sequence, the accumulated value of the sequence number of the pseudo device, and the verification value, and the verification value is used by the verification device to perform path verification.

According to the method provided in the second aspect, verification may be performed on an order in which a data packet passes through intermediate network devices on the path, and the control device and the verification device merely need to perform encryption/decryption processing, so as to reduce a computing load of the intermediate network device. The position sequence number sequence includes the sequence number of the pseudo device, so as to prevent a retransmission attack.

Optionally, the sequence numbers in the available sequence number sequence are arranged in ascending order, the verification value is obtained by encrypting a complete-sequence-number accumulated value, and the control device obtains the accumulated value of the sequence number of the pseudo device and the complete-sequence-number accumulated value based on the position sequence number sequence using the following formulas.

$$c = \left(\sum_{i=1}^{n-1} p_i \times (n-i)!\right) \% \mu;$$

-continued $$p_i = \sum_{j=i+1}^{n} x_j;$$

$$x_j = \begin{cases} 1, s_j < s_i \\ 0, s_j \geq s_i \end{cases}; \text{ and}$$

$$c_f = \left(\sum_{i \in I_f} p_i \times (n-i)!\right) \% \mu,$$

where c is the complete-sequence-number accumulated value, $s_i$ and $s_j$ are respectively a sequence number i and a sequence number j in the position sequence number sequence, n is a length of the position sequence number sequence, $\mu$ is a modulo prime number, $c_f$ is the accumulated value of the sequence number of the pseudo device, and $I_f$ is a set of sorting values of sequence numbers of all pseudo devices in the position sequence number sequence. In this solution, the modulo prime number is used for accumulated value calculation, so as to prevent a retransmission attack.

According to a third aspect, a network device is provided. The network device is one of a plurality of intermediate network devices on a path. A data packet is used by a verification device to perform path verification after being transferred through the path. The network device includes a receiving unit, a processing unit, and a sending unit.

The receiving unit is configured to receive a first data packet sent by a first device, where a packet header of the first data packet includes a first sequence number marker sequence, a first position marker sequence, a first accumulated value, and a verification value, where the first sequence number marker sequence includes a plurality of sequence number markers arranged in order, a first sequence number marker to a last sequence number marker in the first sequence number marker sequence respectively record whether a first sequence number to a last sequence number in an available sequence number sequence are marked, sequence numbers in the available sequence number sequence are arranged in order, and the sequence numbers in the available sequence number sequence include sequence numbers of the plurality of intermediate network devices; the first position marker sequence includes a plurality of position markers arranged in order, a first position marker to a last position marker in the first position marker sequence respectively record whether a first sequence number to a last sequence number in a position sequence number sequence are marked, the position sequence number sequence includes the sequence numbers of the plurality of intermediate network devices and a sequence number of a pseudo device, the sequence numbers of the plurality of intermediate network devices are arranged in the position sequence number sequence in an order of the plurality of intermediate network devices on the path in a sending direction of the first data packet, and the first position marker sequence records that the sequence number of the pseudo device is marked; and the verification value is used by the verification device to perform path verification.

The processing unit is configured to obtain a second data packet, where a packet header of the second data packet includes a second sequence number marker sequence, a second position marker sequence, a second accumulated value, and the verification value, where the second accumulated value is obtained based on the first sequence number marker sequence, the first position marker sequence, and the first accumulated value, the second sequence number marker sequence is obtained by recording, in the first sequence number marker sequence, that a sequence number of the network device is marked, and the second position marker sequence is obtained by recording, in the first position marker sequence, that the sequence number of the network device is marked.

The sending unit is configured to send the second data packet to a second device.

Optionally, the sequence numbers in the available sequence number sequence are arranged in ascending order, and the processing unit obtains the second accumulated value based on the first sequence number marker sequence, the first position marker sequence, and the first accumulated value using the following formula.

$$c_k = (c_m + p \times (n-a)!) \% \mu,$$

where $c_k$ is the second accumulated value, $c_m$ is the first accumulated value, p is a quantity of sequence number markers that are before a current sequence number marker in the first sequence number marker sequence and that record that sequence numbers in the available sequence number sequence are not marked, where the current sequence number marker is a sequence number marker that is in the first sequence number marker sequence and that records whether the sequence number of the network device is marked, n is a length of the first position marker sequence, a is a sorting value of a current position marker in the first position marker sequence, the current position marker is a first position marker that is in the first position marker sequence and that records that a sequence number in the position sequence number sequence is not marked, and μ is a modulo prime number.

According to a fourth aspect, a control device is provided. The control device is configured to communicate with a verification device through a path. The path includes a plurality of intermediate network devices. The control device includes a processing unit and a sending unit.

The processing unit is configured to obtain a sequence number marker sequence and a position marker sequence, where the sequence number marker sequence includes a plurality of sequence number markers arranged in order, a first sequence number marker to a last sequence number marker in the sequence number marker sequence respectively record whether a first sequence number to a last sequence number in an available sequence number sequence are marked, sequence numbers in the available sequence number sequence are arranged in order, and the sequence numbers in the available sequence number sequence include sequence numbers of the plurality of intermediate network devices; and the position marker sequence includes a plurality of position markers arranged in order, a first position marker to a last position marker in the position marker sequence respectively record whether a first sequence number to a last sequence number in a position sequence number sequence are marked, the position sequence number sequence includes the sequence numbers of the plurality of intermediate network devices and a sequence number of a pseudo device, the sequence numbers of the plurality of intermediate network devices are arranged in the position sequence number sequence in an order of the plurality of intermediate network devices on the path in a direction from the control device to the verification device, and the position marker sequence records that the sequence number of the pseudo device is marked; and obtain an accumulated value of the sequence number of the pseudo device and a verification value based on the position sequence number sequence.

The sending unit is configured to send a data packet to a network device, where the network device is a first intermediate network device of the plurality of intermediate network devices on the path in the direction from the control device to the verification device, a packet header of the data packet includes the sequence number marker sequence, the position marker sequence, the accumulated value of the sequence number of the pseudo device, and the verification value, and the verification value is used by the verification device to perform path verification.

Optionally, the sequence numbers in the available sequence number sequence are arranged in ascending order, the verification value is obtained by encrypting a complete-sequence-number accumulated value, and the processing unit obtains the accumulated value of the sequence number of the pseudo device and the complete-sequence-number accumulated value based on the position sequence number sequence using the following formulas.

$$c = \left( \sum_{i=1}^{n-1} p_i \times (n-i)! \right) \% \mu;$$

$$p_i = \sum_{j=i+1}^{n} x_j;$$

$$x_j = \begin{cases} 1, s_j < s_i \\ 0, s_j \geq s_i \end{cases}; \text{ and}$$

$$c_f = \left( \sum_{i \in I_f} p_i \times (n-i)! \right) \% \mu,$$

where c is the complete-sequence-number accumulated value, $s_i$ and $s_j$ are respectively a sequence number i and a sequence number j in the position sequence number sequence, n is a length of the position sequence number sequence, μ is a modulo prime number, $c_f$ is the accumulated value of the sequence number of the pseudo device, and $I_f$ is a set of sorting values of sequence numbers of all pseudo devices in the position sequence number sequence.

According to a fifth aspect, a network device is provided. The network device is one of a plurality of intermediate network devices on a path. A data packet that arrives at a verification device after being transferred through the path is used by the verification device to perform path verification. The network device includes a receiver, a processor, and a transmitter.

The receiver is configured to receive a first data packet sent by a first device, where a packet header of the first data packet includes a first sequence number marker sequence, a first position marker sequence, a first accumulated value, and a verification value, where the first sequence number marker sequence includes a plurality of sequence number markers arranged in order, a first sequence number marker to a last sequence number marker in the first sequence number marker sequence respectively record whether a first sequence number to a last sequence number in an available sequence number sequence are marked, sequence numbers in the available sequence number sequence are arranged in order, and the sequence numbers in the available sequence number sequence include sequence numbers of the plurality of intermediate network devices; the first position marker sequence includes a plurality of position markers arranged in order, a first position marker to a last position marker in the first position marker sequence respectively record whether a first sequence number to a last sequence number in a position sequence number sequence are marked, the position sequence number sequence includes the sequence numbers of the plurality of intermediate network devices and a sequence number of a pseudo device, the sequence numbers of the plurality of intermediate network devices are arranged in the position sequence number sequence in an order of the plurality of intermediate network devices on the path in a sending direction of the first data packet, and the first position marker sequence records that the sequence number of the pseudo device is marked; and the verification value is used by the verification device to perform path verification.

The processor is configured to obtain a second data packet, where a packet header of the second data packet includes a second sequence number marker sequence, a second position marker sequence, a second accumulated value, and the verification value, where the second accumulated value is obtained based on the first sequence number marker sequence, the first position marker sequence, and the first accumulated value, the second sequence number marker sequence is obtained by recording, in the first sequence number marker sequence, that a sequence number of the network device is marked, and the second position marker sequence is obtained by recording, in the first position marker sequence, that the sequence number of the network device is marked.

The transmitter is configured to send the second data packet to a second device.

Optionally, the sequence numbers in the available sequence number sequence are arranged in ascending order, and the processor obtains the second accumulated value based on the first sequence number marker sequence, the first position marker sequence, and the first accumulated value using the following formula.

$$c_k = (c_m + p \times (n-a)!) \% \mu,$$

where $c_k$ is the second accumulated value, $c_m$ is the first accumulated value, p is a quantity of sequence number markers that are before a current sequence number marker in the first sequence number marker sequence and that record that sequence numbers in the available sequence number sequence are not marked, where the current sequence number marker is a sequence number marker that is in the first sequence number marker sequence and that records whether the sequence number of the network device is marked, n is a length of the first position marker sequence, a is a sorting value of a current position marker in the first position marker sequence, the current position marker is a first position marker that is in the first position marker sequence and that records that a sequence number in the position sequence number sequence is not marked, and $\mu$ is a modulo prime number.

According to a sixth aspect, a control device is provided. The control device is configured to communicate with a verification device through a path. The path includes a plurality of intermediate network devices. The control device includes a processor and a transmitter.

The processor is configured to obtain a sequence number marker sequence and a position marker sequence, where the sequence number marker sequence includes a plurality of sequence number markers arranged in order, a first sequence number marker to a last sequence number marker in the sequence number marker sequence respectively record whether a first sequence number to a last sequence number in an available sequence number sequence are marked, sequence numbers in the available sequence number sequence are arranged in order, and the sequence numbers in the available sequence number sequence include sequence numbers of the plurality of intermediate network devices; and the position marker sequence includes a plurality of position markers arranged in order, a first position marker to a last position marker in the position marker sequence respectively record whether a first sequence number to a last sequence number in a position sequence number sequence are marked, the position sequence number sequence includes the sequence numbers of the plurality of intermediate network devices and a sequence number of a pseudo device, the sequence numbers of the plurality of intermediate network devices are arranged in the position sequence number sequence in an order of the plurality of intermediate network devices on the path in a direction from the control device to the verification device, and the position marker sequence records that the sequence number of the pseudo device is marked; and obtain an accumulated value of the sequence number of the pseudo device and a verification value based on the position sequence number sequence.

The transmitter is configured to send a data packet to a network device, where the network device is a first intermediate network device of the plurality of intermediate network devices on the path in the direction from the control device to the verification device, a packet header of the data packet includes the sequence number marker sequence, the position marker sequence, the accumulated value of the sequence number of the pseudo device, and the verification value, and the verification value is used by the verification device to perform path verification.

Optionally, the sequence numbers in the available sequence number sequence are arranged in ascending order, the verification value is obtained by encrypting a complete-sequence-number accumulated value, and the processor obtains the accumulated value of the sequence number of the pseudo device and the complete-sequence-number accumulated value based on the position sequence number sequence using the following formulas.

$$c = \left( \sum_{i=1}^{n-1} p_i \times (n-i)! \right) \% \mu;$$

$$p_i = \sum_{j=i+1}^{n} x_j;$$

$$x_j = \begin{cases} 1, s_j < s_i \\ 0, s_j \geq s_i \end{cases}; \text{ and}$$

$$c_f = \left( \sum_{i \in I_f} p_i \times (n-i)! \right) \% \mu,$$

where c is the complete-sequence-number accumulated value, $s_i$, and $s_j$ are respectively a sequence number i and a sequence number j in the position sequence number sequence, n is a length of the position sequence number sequence, $\mu$ is a modulo prime number, $c_f$ is the accumulated value of the sequence number of the pseudo device, and $I_f$ is a set of sorting values of sequence numbers of all pseudo devices in the position sequence number sequence.

According to a seventh aspect, a network system is provided. The network system includes a control device, a verification device, and a plurality of intermediate network devices. The control device communicates with the verification device through a path. The path includes the plurality of intermediate network devices.

The control device is configured to obtain a first sequence number marker sequence and a first position marker sequence, where the first sequence number marker sequence includes a plurality of sequence number markers arranged in order, a first sequence number marker to a last sequence number marker in the first sequence number marker sequence respectively record whether a first sequence number to a last sequence number in an available sequence number sequence are marked, sequence numbers in the available sequence number sequence are arranged in order, and the sequence numbers in the available sequence number sequence include sequence numbers of the plurality of intermediate network devices; and the first position marker sequence includes a plurality of position markers arranged in order, a first position marker to a last position marker in the first position marker sequence respectively record whether a first sequence number to a last sequence number in a position sequence number sequence are marked, the position sequence number sequence includes the sequence numbers of the plurality of intermediate network devices and a sequence number of a pseudo device, the sequence numbers of the plurality of intermediate network devices are arranged in the position sequence number sequence in an order of the plurality of intermediate network devices on the path in a direction from the control device to the verification device, and the first position marker sequence records that the sequence number of the pseudo device is marked; obtain a first accumulated value and a verification value based on the position sequence number sequence; and send a first data packet to a first network device, where the first network device is a first intermediate network device of the plurality of intermediate network devices on the path in the direction from the control device to the verification device, and a packet header of the first data packet includes the first sequence number marker sequence, the first position marker sequence, the first accumulated value, and the verification value. each of the plurality of intermediate network devices is configured to receive a second data packet sent by an upstream device, where the upstream device is a previous device of each intermediate network device on the path in the direction from the control device to the verification device, and a packet header of the second data packet includes a second sequence number marker sequence, a second position marker sequence, a second accumulated value, and the verification value, where the second sequence number marker sequence includes a plurality of sequence number markers arranged in order, and a first sequence number marker to a last sequence number marker in the second sequence number marker sequence respectively record whether the first sequence number to the last sequence number in the available sequence number sequence are marked; and the second position marker sequence includes a plurality of position markers arranged in order, and a first position marker to a last position marker in the second position marker sequence respectively record whether the first sequence number to the last sequence number in the position sequence number sequence are marked; obtain a third data packet, where a packet header of the third data packet includes a third sequence number marker sequence, a third position marker sequence, a third accumulated value, and the verification value, where the third accumulated value is obtained based on the second sequence number marker sequence, the second position marker sequence, and the second accumulated value, the third sequence number marker sequence is obtained by recording, in the second sequence number marker sequence, that a sequence number of each intermediate network device is marked, and the third position marker sequence is obtained by recording, in the second position marker sequence, that the sequence number of each intermediate network device is marked; and send the third data packet to a downstream device, where the downstream device is a next device of each intermediate network device on the path in the direction from the control device to the verification device.

The verification device is configured to receive a fourth data packet sent by a second network device, where the second network device is a last intermediate network device of the plurality of intermediate network devices on the path in the direction from the control device to the verification device, and a packet header of the fourth data packet includes a fourth accumulated value and the verification value; and perform path verification based on the fourth accumulated value and the verification value.

Optionally, the sequence numbers in the available sequence number sequence are arranged in ascending order, the verification value is obtained by encrypting a complete-sequence-number accumulated value, and the control device obtains the first accumulated value and the complete-sequence-number accumulated value based on the position sequence number sequence using the following formulas.

$$c = \left(\sum_{i=1}^{n-1} p_i \times (n-i)!\right) \% \mu;$$

$$p_i = \sum_{j=i+1}^{n} x_j;$$

$$x_j = \begin{cases} 1, s_j < s_i \\ 0, s_j \geq s_i \end{cases}; \text{ and}$$

$$c_f = \left(\sum_{i \in I_f} p_i \times (n-i)!\right) \% \mu,$$

where c is the complete-sequence-number accumulated value, $s_i$ and $s_j$ are respectively a sequence number i and a sequence number j in the position sequence number sequence, n is a length of the position sequence number sequence, $\mu$ is a modulo prime number, $c_f$ is the first accumulated value, and $I_f$ is a set of sorting values of sequence numbers of all pseudo devices in the position sequence number sequence; each intermediate network device obtains the third accumulated value based on the second sequence number marker sequence, the second position marker sequence, and the second accumulated value using the following formula.

$$c_k = (c_m + p \times (n-a)!) \% \mu,$$

where $c_k$ is the third accumulated value, $c_m$ is the second accumulated value, p is a quantity of sequence number markers that are before a current sequence number marker in the second sequence number marker sequence and that record that sequence numbers in the available sequence number sequence are not marked, where the current sequence number marker is a sequence number marker that is in the second sequence number marker sequence and that records whether the sequence number of each intermediate network device is marked, and a is a sorting value of a current position marker in the second position marker sequence, where the current position marker is a first position marker that is in the second position marker sequence and that records that a sequence number in the position sequence number sequence is not marked; and the performing path verification based on the fourth accumulated value and the verification value includes determining whether a decryption value obtained by decrypting the verification value is equal to the fourth accumulated value, or determining whether an encryption value obtained by encrypting the fourth accumulated value is equal to the verification value.

According to an eighth aspect, a computer readable storage medium is provided. The computer readable storage medium stores an instruction, and when the instruction is executed, a computer performs the method in each aspect.

According to a ninth aspect, a computer program product including an instruction is provided, where when the instruction is executed, a computer performs the method in each aspect.

DESCRIPTION OF EMBODIMENTS

Implementations of the present disclosure are further described in detail below with reference to the accompanying drawings.

Figure 1:
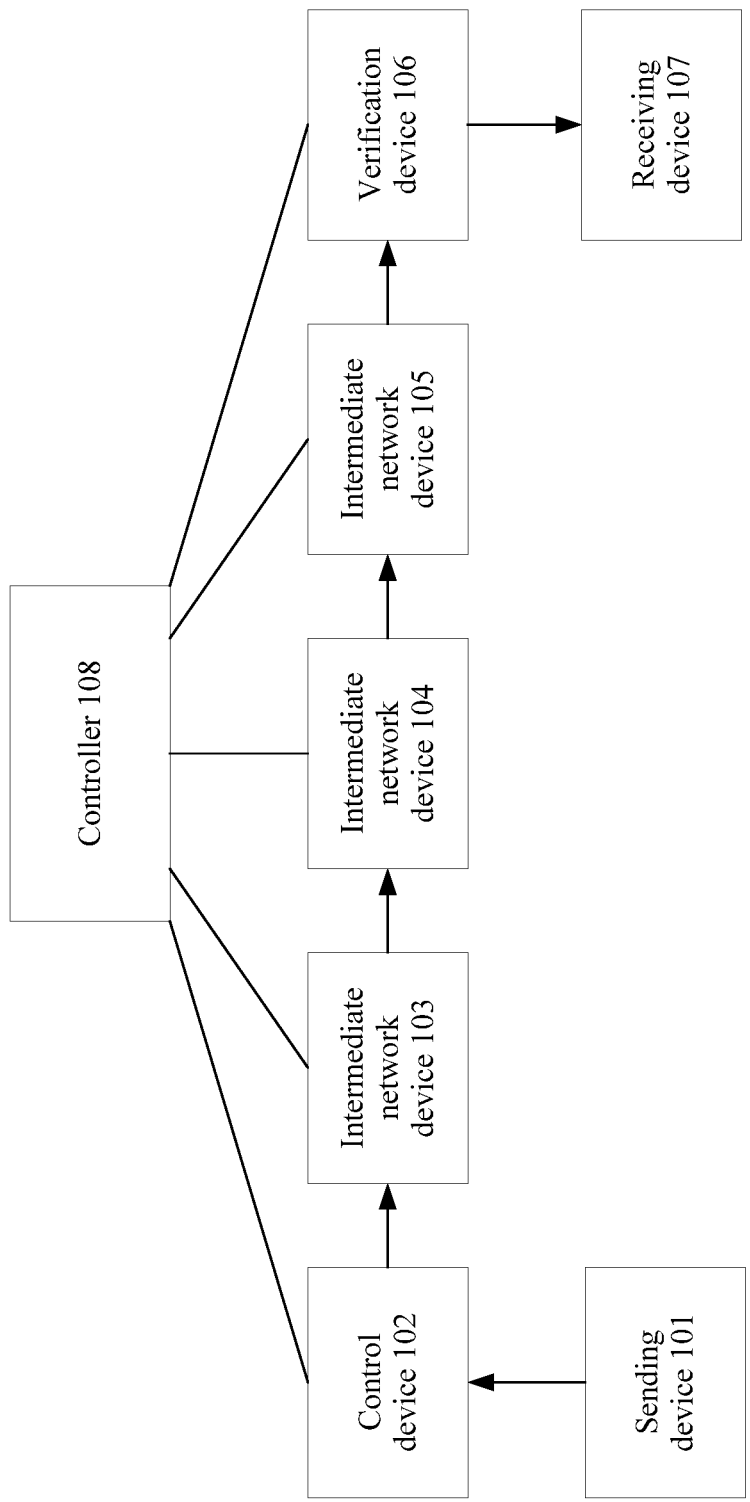
FIG. 1 is a schematic diagram of an application scenario according to an embodiment of this application.

FIG. 1 is a schematic diagram of an application scenario according to an embodiment of this application. As shown in FIG. 1, a data packet sent by a sending device 101 arrives at a control device 102, arrives at a verification device 106 through a path that includes a plurality of intermediate network devices (the plurality of intermediate network devices are two or more intermediate network devices, and an example in which the plurality of intermediate network devices are an intermediate network device 103, an intermediate network device 104, and an intermediate network device 105 is used in FIG. 1), and arrives at a receiving device 107 after the verification device 106 performs path verification. A controller 108 may communicate with the control device 102, the plurality of intermediate network devices, and the verification device 106. For example, the control device 102, the plurality of intermediate network devices, and the verification device 106 may be in a data center network, and are managed by the controller 108 together. The sending device 101 is, for example, user equipment. The control device 102 is, for example, a gateway device. The intermediate network device 103 is, for example, a device that performs firewall processing. The intermediate network device 104 is, for example, a device that performs antivirus processing. The intermediate network device 105 is, for example, a device that performs network optimization. The verification device 106 is, for example, a gateway device that performs path verification.

The receiving device 107 is, for example, a server. Therefore, after passing through the gateway device, the device that performs firewall processing, the device that performs antivirus processing, and the device that performs network optimization, the data packet sent by the user equipment arrives at the gateway device that performs path verification. The gateway device that performs path verification performs verification on the path through which the received data packet passes, and sends the data packet to the server after the verification succeeds.

Figure 2:
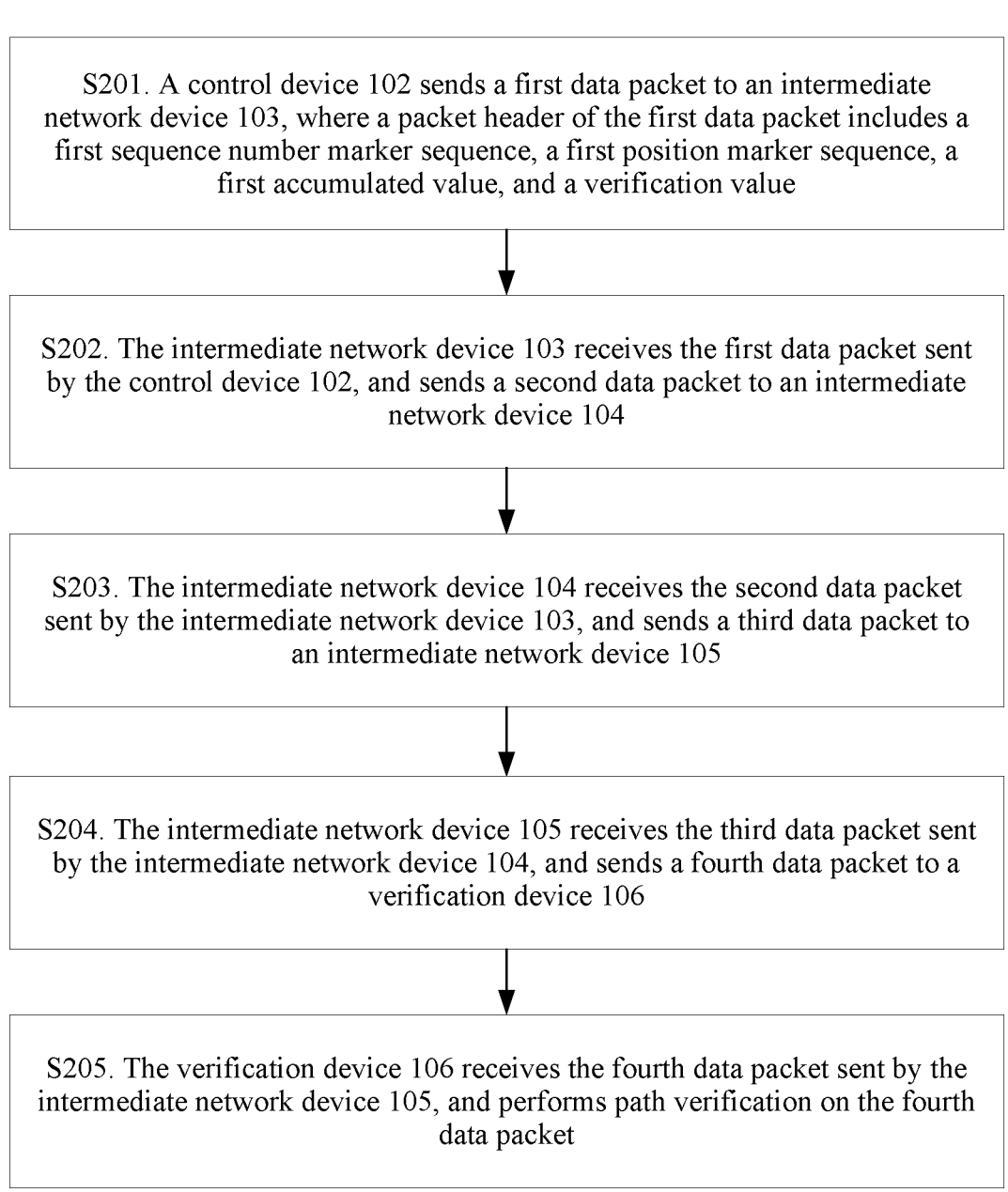
FIG. 2 is a flowchart of a data packet sending method according to an embodiment of this application.

FIG. 2 is a flowchart of a data packet sending method according to an embodiment of this application. The method may be applied to the scenario shown in FIG. 1, to implement path verification.

S201. A control device 102 sends a first data packet to an intermediate network device 103, where a packet header of the first data packet includes a first sequence number marker sequence, a first position marker sequence, a first accumulated value, and a verification value.

The control device 102 obtains the first sequence number marker sequence and the first position marker sequence. The first sequence number marker sequence includes a plurality of sequence number markers arranged in order, and a first sequence number marker to a last sequence number marker respectively record whether a first sequence number to a last sequence number in an available sequence number sequence are marked. The available sequence number sequence includes a plurality of sequence numbers arranged in order (in ascending order or in descending order). The sequence numbers in the available sequence number sequence include sequence numbers of all intermediate network devices on a path from the control device 102 to a verification device 106. The available sequence number sequence may further include a sequence number that does not belong to any intermediate network device. The control device 102 may obtain the available sequence number sequence based on the sequence numbers of all the intermediate network devices on the path that are sent by a controller 108, an available sequence number set, or a maximum available sequence number. For example, the control device 102 obtains an available sequence number sequence (1, 2, 3) based on sequence numbers 2, 3, and 1 of intermediate network devices 103, 104, and 105 that are sent by the controller 108. The available sequence number set is a set that includes all available sequence numbers. For example, the control device 102 may obtain an available sequence number sequence (1, 2, 3, 4) based on an available sequence number set {1, 2, 3, 4} sent by the controller 108. For another example, the control device 102 obtains an available sequence number sequence (1, 2, 3, 4) starting from 1 to a maximum available sequence number 4 sent by the controller 108. Alternatively, the control device 102 may directly receive the available sequence number sequence sent by the controller 108. The controller 108 may further send identifiers of all the intermediate network devices on the path to the control device 102, and the identifiers are, for example, a Media Access Control (MAC) address or an Internet Protocol (IP) address.

Alternatively, the control device 102 may obtain the available sequence number sequence based on preset sequence numbers of all the intermediate network devices on the path that are stored in the control device 102, an available sequence number set, or a maximum available sequence number. For example, the control device 102 obtains an available sequence number sequence (1, 2, 3) based on preset sequence numbers 2, 3, and 1 of intermediate network devices 103, 104, and 105 that are stored in the control device 102. For another example, the control device 102 obtains an available sequence number sequence (1, 2, 3, 4) based on a preset available sequence number set {1, 2, 3, 4} stored in the control device 102. For another example, the control device 102 obtains an available sequence number sequence (1, 2, 3, 4) starting from 1 to a preset maximum available sequence number 4 stored in the control device 102. Alternatively, the control device 102 may directly obtain a preset available sequence number sequence stored in the control device 102. The first sequence number marker sequence obtained by the control device 102 records that none of the sequence numbers in the available sequence number sequence is marked.

The foregoing sequence numbers 1, 2, and 3 are respectively the sequence numbers of the intermediate network devices 105, 103, and 104, and the sequence number 4 is a sequence number that does not belong to any intermediate network device. A length of the first sequence number marker sequence (namely, a quantity of sequence number markers included in the first sequence number marker sequence) is the same as a length of the available sequence number sequence.

The control device 102 may obtain the first sequence number marker sequence based on the length of the available sequence number sequence. The first sequence number marker sequence may be a bit sequence, a bit value 0 indicates that a sequence number is not marked, and a bit value 1 indicates that a sequence number is marked. For example, when the available sequence number sequence is (1, 2, 3, 4), the length of the available sequence number sequence is 4, and the first sequence number marker sequence includes four zeros, namely, (0, 0, 0, 0). The four zeros in the first sequence number marker sequence from front to back respectively indicate that available sequence numbers 1, 2, 3, and 4 are not marked. The sequence numbers in the available sequence number sequence in the foregoing examples are all arranged in ascending order. Likewise, the sequence numbers in the available sequence number sequence may be arranged in descending order.

The first position marker sequence includes a plurality of position markers arranged in order, and a first position marker to a last position marker respectively record whether a first sequence number to a last sequence number in a position sequence number sequence are marked. The position sequence number sequence includes the sequence numbers of all the intermediate network devices on the path from the control device 102 to the verification device 106. The sequence numbers of all the intermediate network devices are arranged in the position sequence number sequence in an order of all the intermediate network devices on the path in a direction from the control device 102 to the verification device 106. The position sequence number sequence may further include a sequence number of a pseudo device. The pseudo device is an imaginary device having a sequence number, and may not be an actual device. The sequence number of the pseudo device is greater than a sequence number of any intermediate network device on the path. The control device 102 may arrange the sequence numbers in the order of all the intermediate network devices on the path based on the sequence numbers of all the intermediate network devices that are sent by the controller 108 or are preset, and insert the sequence number of the pseudo device at a random position, to obtain the position sequence number sequence. There may be one or more sequence numbers of pseudo devices. For example, if the sequence numbers of the intermediate network devices 103, 104, and 105 on the path shown in FIG. 1 are respectively 2, 3, and 1, the position sequence number sequence may be (5, 2, 3, 6, 1), where 5 and 6 are sequence numbers of pseudo devices, and positions of the sequence numbers 5 and 6 are randomly selected by the control device 102. A sorting value of the sequence number 5 in the position sequence number sequence is 1, and a sorting value of the sequence number 6 in the position sequence number sequence is 4. Sorting values of the sequence numbers 2, 3, and 1 are respectively 2, 3, and 5, and an order of arranging the sequence numbers 2, 3, and 1 is the same as an order of the intermediate network devices 103, 104, and 105 on the path.

The control device 102 may obtain the first position marker sequence based on the position sequence number sequence. A length of the first position marker sequence is the same as a length of the position sequence number sequence (in other words, a quantity of position markers included in the first position marker sequence is the same as a quantity of sequence numbers included in the position sequence number sequence, and the sequence numbers included in the position sequence number sequence include the sequence numbers of all the intermediate network devices on the path and the sequence number of the pseudo device). The first position marker sequence obtained by the control device 102 records that sequence numbers of all pseudo devices in the position sequence number sequence are marked. The first position marker sequence obtained by the control device 102 records that none of the sequence numbers of all the intermediate network devices in the position sequence number sequence is marked. The first position marker sequence may be a bit sequence, a bit value 0 indicates that a sequence number is not marked, and a bit value 1 indicates that a sequence number is marked. For example, when the position sequence number sequence is (5, 2, 3, 6, 1), the first position marker sequence is (1, 0, 0, 1, 0), where a first position marker and a fourth position marker respectively indicate that a sequence number 5 of a pseudo device and a sequence number 6 of a pseudo device are marked.

The control device 102 obtains an accumulated value of the sequence number of the pseudo device and the verification value based on the position sequence number sequence. The control device 102 may obtain the accumulated value of the sequence number of the pseudo device and a complete-sequence-number accumulated value using the following formulas.

$$c = \left(\sum_{i=1}^{n-1} p_i \times (n-i)!\right) \% \mu;$$

$$p_i = \sum_{j=i+1}^{n} x_j;$$

$$x_j = \begin{cases} 1, s_j < s_i \\ 0, s_j \geq s_i \end{cases}; \text{ and}$$

$$c_f = \left(\sum_{i \in I_f} p_i \times (n-i)!\right) \% \mu,$$

where c is the complete-sequence-number accumulated value, $s_i$, and $s_j$ are respectively a sequence number i and a sequence number j in the position sequence number sequence, n is the length of the position sequence number sequence, μ is a modulo prime number, where the modulo prime number may be sent by the controller 108 to the control device 102 or may be preset in the control device

102, $c_f$ is the accumulated value of the sequence number of the pseudo device, and $I_f$ is a set of sorting values of the sequence numbers of all the pseudo devices in the position sequence number sequence.

The control device 102 encrypts the complete-sequence-number accumulated value using an encryption key, to obtain the verification value. The encryption key may be received from the controller 108, or may be preset in the control device 102. The encryption may be implemented using various existing encryption algorithms. The verification value is subsequently used by the verification device 106 to perform path verification.

For example, the modulo prime number is 7, and the position sequence number sequence is (5, 2, 3, 6, 1). In this case, n is equal to 5, and $s_1, s_2, s_3, s_4$, and $s_5$ are respectively 5, 2, 3, 6, and 1. A process of calculating the complete-sequence-number sequence accumulated value c and the accumulated value $c_f$ of the sequence number of the pseudo device is as follows.

$$c = (p_1 \times (5-1)! + p_2(5-2)! + p_3 \times (5-3)! + p_4 \times (5-4)!)\%7;$$

$$p_1 = \sum_{j=2}^{5} x_j = x_2 + x_3 + x_4 + x_5 = 1 + 1 + 0 + 1 = 3;$$

$$x_2 = 1, s_2 < s_1;$$

$$x_3 = 1, s_3 < s_1;$$

$$x_4 = 0, s_4 > s_1; \text{ and}$$

$$x_5 = 1, s_5 < s_1.$$

A process of calculating p2, p3, and p4 is similar to a process of calculating p1, and is briefly described as follows.

$$p_2 = \sum_{j=3}^{5} x_j = x_3 + x_4 + x_5 = 0 + 0 + 1 = 1;$$

$$p_3 = \sum_{j=4}^{5} x_j = x_4 + x_5 = 0 + 1 = 1; \text{ and}$$

$$p_4 = \sum_{j=5}^{5} x_j = x_5 = 1.$$

Therefore, the complete-sequence-number sequence accumulated value may be obtained as follows.

$$c = (p_1 \times (5-1)! + p_2(5-2)! + p_3 \times (5-3)! + p_4 \times (5-4)!)\%7$$

$$= (3 \times (5-1)! + 1 \times (5-2)! + 1 \times (5-3)! + 1 \times (5-4)!)\%7$$

$$= (3 \times 4! + 1 \times 3! + 1 \times 2! + 1 \times 1!)\%7$$

$$= (3 \times 24 + 1 \times 6 + 1 \times 2 + 1 \times 1)\%7$$

$$= 81\%7 = 4.$$

A set $I_f$ of sorting values of the sequence number 5 of the pseudo device and the sequence number 6 of the pseudo device in the position sequence number sequence (5, 2, 3, 6, 1) is {1, 4}. With reference to the foregoing calculation results, the accumulated value $c_f$ of the sequence number of the pseudo device may be calculated as follows.

$$c_f = \left(\sum_{i \in I_f} p_i \times (n-i)!\right)\% \mu$$

$$= (p_1 \times (5-1)! + p_4 \times (5-4)!)\%7$$

$$= (3 \times 4! + 1 \times 1!)\%7 = (3 \times 24 + 1 \times 1)\%7$$

$$= 73\%7 = 3.$$

The control device 102 may obtain the verification value by encrypting the complete-sequence-number sequence accumulated value 4.

Then, the control device 102 generates the first data packet, and the first data packet includes verification information. For example, the verification information includes the first sequence number marker sequence, the first position marker sequence, the first accumulated value (namely, the accumulated value $c_f$ of the sequence number of the pseudo device), and the verification value. The control device 102 may receive an original data packet from a sending device 101 or generate an original data packet, and add the verification information to a packet header of the original data packet from the sending device 101 or a packet header of the generated original data packet, to obtain the first data packet. For a manner of adding the verification information to the packet header, refer to the draft of the Internet Engineering Task Force (IETF): Encapsulations for In-situ OAM Data (draft-brockners-inband-oam-transport-03), which is incorporated herein by reference in its entirety. The draft describes packet formats of adding information to a packet header of a data packet in several protocols such as the Internet Protocol version 6 (IPv6), the Internet Protocol version 4 (IPv4), the Virtual Extensible Local Area Network-Generic Protocol Extension (VXLAN-GPE), the Network Service Header (NSH), and the Segment Routing. For example, an IPv6 packet format is used for the first data packet, and the verification information may be added to an IPv6 hop-by-hop options header (hop-by-hop option header). For another example, an IPv4 packet format is used for the first data packet, and the verification information may be transferred using the Generic Routing Encapsulation (GRE). For the Generic Routing Encapsulation, refer to the Request for Comments (RFC) 2784. In-situ operation, administration, and maintenance (IOAM) data fields after a GRE packet header may be used to add the verification information.

The control device 102 sends the first data packet that includes the verification information to the intermediate network device 103. The intermediate network device 103 is a first intermediate network device of the intermediate network devices on the path in the direction from the control device 102 to the verification device 106.

S202. The intermediate network device 103 receives the first data packet sent by the control device 102, and sends a second data packet to an intermediate network device 104.

After receiving the first data packet, the intermediate network device 103 obtains the second data packet. A packet header of the second data packet includes a second sequence number marker sequence, a second position marker sequence, a second accumulated value, and the verification value in S201.

The intermediate network device 103 calculates the second accumulated value based on the first sequence number marker sequence, the first position marker sequence, and the first accumulated value. The second accumulated value may be further calculated using the following formula.

$$c_2 = (c_1 + p \times (n-a)!)\%\mu,$$

where $c_2$ is the second accumulated value, $c_1$ is the first accumulated value, p is a quantity of sequence number markers that are before a current sequence number marker in the first sequence number marker sequence and that record that sequence numbers in the available sequence number sequence are not marked, where the current sequence number marker is a sequence number marker that is in the first sequence number marker sequence and that records whether the sequence number of the intermediate network device 103 is marked, n is the length of the first position marker sequence, a is a sorting value of a current position marker in the first position marker sequence, the current position marker is a first position marker that is in the first position marker sequence and that records that a sequence number in the position sequence number sequence is not marked, and μ is a modulo prime number, where the modulo prime number may be sent by the controller 108 to the intermediate network device 103 or may be preset in the intermediate network device 103, and the modulo prime number is the same as the modulo prime number used by the control device 102. The sequence number of the intermediate network device 103 may be assigned and sent by the controller 108 to the intermediate network device 103, or may be preset in the intermediate network device 103. After assigning the sequence numbers to all the intermediate network devices on the path, the controller 108 may respectively send, to the intermediate network devices, the sequence numbers assigned to the intermediate network devices. For example, in the scenario shown in FIG. 1, the controller 108 may respectively assign the sequence numbers 2, 3, and 1 to the intermediate network devices 103, 104, and 105, send the sequence number 2 to the intermediate network device 103, send the sequence number 3 to the intermediate network device 104, and send the sequence number 1 to the intermediate network device 105. The intermediate network devices store only their respective sequence numbers such that one intermediate network device can be prevented from disclosing sequence numbers of other intermediate network devices after being attacked, thereby improving security.

For example, in the scenario shown in FIG. 1, the modulo prime number is 7, the first accumulated value (namely, the accumulated value of the sequence number of the pseudo device in S201) is 3, the first sequence number marker sequence is (0, 0, 0, 0), the first position marker sequence is (1, 0, 0, 1, 0), the length n of the first position marker sequence is 5, the available sequence number sequence is (1, 2, 3, 4), and the position sequence number sequence is (5, 2, 3, 6, 1). The sequence number of the intermediate network device 103 is 2, and a sequence number marker that is in the first sequence number marker sequence and that records whether the sequence number 2 is marked is a second sequence number marker (in other words, a sorting value is 2). There is only a first sequence number marker before the second sequence number marker in the first sequence number marker sequence (0, 0, 0, 0), and a value of the first sequence number marker is 0 (in other words, it is recorded that the sequence number 1 in the available sequence number sequence is not marked). Therefore, a value of p is 1. A first position marker whose value is 0 (in other words, a first position marker recording that the sequence number in the position sequence number sequence is not marked) in the first position marker sequence (1, 0, 0, 1, 0) is a second position marker (in other words, a sorting value is 2). Therefore, a value of a is 2. Therefore, the second accumulated value $c_2$ is calculated as follows.

$$c_2 = (c_1 + p \times (n-a)!) \% \mu$$
$$= (3 + 1 \times (5-2)!) \% 7 = (3 + 1 \times 6) \% 7$$
$$= 2.$$

The intermediate network device 103 further obtains the second sequence number marker sequence by recording, in the first sequence number marker sequence, that the sequence number of the intermediate network device 103 is marked. The intermediate network device 103 determines a sequence number marker (namely, the current sequence number marker) that is in the first sequence number marker sequence and whose sorting value is equal to the sequence number of the intermediate network device 103, and records a value of the sequence number marker as "marked". For example, the sequence number of the intermediate network device 103 is 2, and the intermediate network device 103 records a value of a second sequence number marker (in other words, a sorting value is 2) in the first sequence number marker sequence (0,0,0,0) as 1, and obtains a second sequence number marker sequence (0, 1, 0, 0).

The intermediate network device 103 further obtains the second position marker sequence by recording, in the first position marker sequence, that the sequence number of the intermediate network device 103 is marked. The sequence number of the pseudo device in the first position marker sequence is marked, and none of the sequence numbers of the intermediate network devices is marked. Therefore, a first position marker that is in the first position marker sequence and that records that the sequence number is not marked is a position marker (namely, the current position marker) that records whether the sequence number of the intermediate network device 103 (the intermediate network device 103 is the first intermediate network device on the path in the direction from the control device 102 to the verification device 106) is marked. For example, the first position marker sequence is (1, 0, 0, 1, 0), the position sequence number sequence is (5, 2, 3, 6, 1), and there are totally three position markers in the first position marker sequence whose values are 0, which respectively sequentially record that the sequence numbers 2, 3, and 1 of the intermediate network devices 103, 104, and 105 are not marked. A first position marker whose value is 0 records that the sequence number 2 of the intermediate network device 103 is not marked. The intermediate network device 103 records a value of the first position marker whose value is 0 as 1, and obtains a second position marker sequence (1, 1, 0, 1, 0).

The intermediate network device 103 obtains the second data packet based on the second accumulated value, the second sequence number marker sequence, the second position marker sequence, and the verification value, and sends the second data packet to the intermediate network device 104. A packet format of the second data packet may be the same as a packet format of the first data packet. Subsequently, both a packet format of a third data packet in S203 and a packet format of a fourth data packet in S204 may be the same as the packet format of the first data packet.

S203. The intermediate network device 104 receives the second data packet sent by the intermediate network device 103, and sends a third data packet to an intermediate network device 105.

A processing process of the intermediate network device 104 is similar to the processing process of the intermediate network device 103. For details, refer to S202. An example of the processing process is as follows.

The intermediate network device 104 receives the second data packet sent by the intermediate network device 103. The packet header of the second data packet includes the second sequence number marker sequence (0, 1, 0, 0), the second position marker sequence (1, 1, 0, 1, 0), the second accumulated value $c_2$ 2, and the verification value (which is the same as the verification value in S202).

The intermediate network device 104 calculates a third accumulated value $c_3$ using the following formula.

$$c_3 = (c_2 + p \times (n-a)!) \% \ \mu$$
$$= (2 + 1 \times (5-3)!) \% 7 = 4 \% 7$$
$$= 4,$$

where the sequence number of the intermediate network device 104 is 3, and there are two sequence number markers before a third sequence number marker in the second sequence number marker sequence (0, 1, 0, 0), but there is only one sequence number marker whose value is 0, and therefore a value of p is 1; and a first position marker whose value is 0 in the second position marker sequence (1, 1, 0, 1, 0) is a third position marker (in other words, a sorting value is 3), and therefore a value of a is 3.

The sequence number of the intermediate network device 104 is 3. Therefore, the intermediate network device 104 records a value of the third sequence number marker in the second sequence number marker sequence (0, 1, 0, 0) as 1, to obtain a third sequence number marker sequence (0, 1, 1, 0).

The intermediate network device 104 records a value of a first position marker whose value is 0 in the second position marker sequence (1, 1, 0, 1, 0) as 1, to obtain a third position marker sequence (1, 1, 1, 1, 0). The position sequence number sequence is (5, 2, 3, 6, 1), the second position marker sequence is (1, 1, 0, 1, 0), and the first position marker whose value is 0 in the second position marker sequence records that the sequence number 3 of the intermediate network device 104 is not marked.

The intermediate network device 104 obtains the third data packet based on the third accumulated value (namely, 4), the third sequence number marker sequence (0, 1, 1, 0), the third position marker sequence (1, 1, 1, 1, 0), and the verification value, and sends the third data packet to the intermediate network device 105.

S204. The intermediate network device 105 receives the third data packet sent by the intermediate network device 104, and sends a fourth data packet to a verification device 106.

A processing process of the intermediate network device 105 is similar to the processing process of the intermediate network device 103. For details, refer to S202. An example of the processing process is as follows.

The intermediate network device 105 receives the third data packet sent by the intermediate network device 104. A packet header of the third data packet includes the third sequence number marker sequence (0, 1, 1, 0), the third position marker sequence (1, 1, 1, 1, 0), the third accumulated value $c_3$ 4, and the verification value (which is the same as the verification value in S203).

The intermediate network device 105 calculates a fourth accumulated value $c_4$ using the following formula.

$$c_4 = (c_3 + p \times (n-a)!) \% \ \mu$$
$$= (4 + 0 \times (5-5)!) \% 7 = 4 \% 7$$
$$= 4,$$

where the sequence number of the intermediate network device 105 is 1, and there is no sequence number marker before a first sequence number marker in the third sequence number marker sequence (0, 1, 1, 0), and therefore a value of p is 0; and a first position marker whose value is 0 in the third position marker sequence (1,1,1,1,0) is a fifth position marker (in other words, a sorting value is 5), and therefore a value of a is 5.

The sequence number of the intermediate network device 105 is 1. Therefore, the intermediate network device 105 records a value of the first sequence number marker in the third sequence number marker sequence (0, 1, 1, 0) as 1, to obtain a fourth sequence number marker sequence (1, 1, 1, 0).

The intermediate network device 105 records a value of a first position marker whose value is 0 in the third position marker sequence (1, 1, 1, 1, 0) as 1, to obtain a fourth position marker sequence (1, 1, 1, 1, 1). The position sequence number sequence is (5, 2, 3, 6, 1), the second position marker sequence is (1, 1, 1, 1, 0), and the first position marker whose value is 0 in the third position marker sequence records that the sequence number 1 of the intermediate network device 105 is not marked.

The intermediate network device 105 obtains the fourth data packet based on the fourth accumulated value (namely, 4), the fourth sequence number marker sequence (1, 1, 1, 0), the fourth position marker sequence (1, 1, 1, 1, 1), and the verification value, and sends the fourth data packet to the verification device 106.

S205: The verification device 106 receives the fourth data packet sent by the intermediate network device 105, and performs path verification on the fourth data packet.

A packet header of the fourth data packet includes the fourth sequence number marker sequence (1, 1, 1, 0), the fourth position marker sequence (1, 1, 1, 1, 1), the fourth accumulated value (namely, 4), and the verification value (which is the same as the verification value in S204). Values of all position markers in the fourth position marker sequence (1, 1, 1, 1, 1) are 1. It indicates that the sequence numbers of all the intermediate network devices on the path in the position sequence number sequence are marked. It is equivalent to that load data in the fourth data packet except the packet header is transferred to the verification device 106 after passing through all the intermediate network devices on the path.

The verification device 106 decrypts the verification value using a decryption key, and determines whether a decryption value is equal to the fourth accumulated value. The decryption key may be sent by the controller 108 to the verification device 106, or may be preset in the verification device 106. Alternatively, the verification device 106 may encrypt the fourth accumulated value using an encryption key, and determine whether an encryption value is equal to the verification value. The encryption key may be sent by the controller 108 to the verification device 106, or may be preset in the verification device 106. If the decryption value is equal to the fourth accumulated value or the encryption value is equal to the verification value, it indicates that the verification succeeds (in other words, the data packet sent by the control device 102 successively passes through all the intermediate network devices on the path in the direction from the control device 102 to the verification device 106). If the verification succeeds, the verification device 106 may send the fourth data packet to a receiving device 107. If the decryption value is not equal to the fourth accumulated value or the encryption value is not equal to the verification value (in other words, the data packet sent by the control device 102 does not successively pass through all the intermediate network devices on the path in the direction from the control device 102 to the verification device 106), the verification device 106 may perform exception processing, and does not send the fourth data packet to the receiving device 107. For example, the exception processing is sending an alarm message or performing log addition.

In the transmission process of the foregoing method, accumulated values are accumulated hop by hop, verification may be performed on an order in which a data packet passes through intermediate network devices on the path, and the control device 102 and the verification device 106 merely need to perform encryption/decryption processing, so as to reduce a computing load of the intermediate network device.

In the foregoing method, the control device 102 inserts the sequence number of the pseudo device at a random position of the position sequence number sequence such that all generated verification values are different, thereby helping to prevent a retransmission attack. A calculation result obtained after a modulo operation is performed on the accumulated value is transmitted, so as to prevent a retransmission attack.

In the foregoing method, the first sequence number marker sequence to the fourth sequence number marker sequence and the first position marker sequence to the fourth position marker sequence may be bit sequences, and an amount of data that needs to be transmitted is relatively small, so as to improve transmission efficiency. The first sequence number marker sequence to the fourth sequence number marker sequence and the first position marker sequence to the fourth position marker sequence may be directly processed based on bit values, so as to improve processing efficiency.

Figure 3:
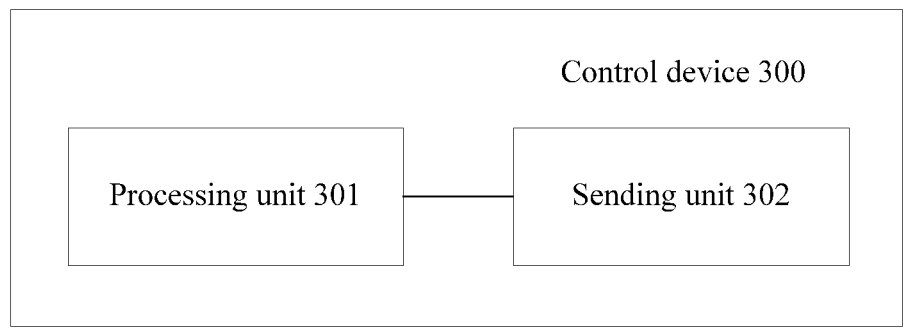
FIG. 3 is a structural diagram of a control device 300 according to an embodiment of this application.

FIG. 3 is a structural diagram of a control device 300 according to an embodiment of this application. The control device 300 may be the control device 102 in the method shown in FIG. 2. The control device 300 includes a processing unit 301 and a sending unit 302.

The processing unit 301 is configured to obtain a sequence number marker sequence and a position marker sequence, where the sequence number marker sequence includes a plurality of sequence number markers arranged in order, a first sequence number marker to a last sequence number marker in the sequence number marker sequence respectively record whether a first sequence number to a last sequence number in an available sequence number sequence are marked, sequence numbers in the available sequence number sequence are arranged in order, and the sequence numbers in the available sequence number sequence include sequence numbers of the plurality of intermediate network devices; and the position marker sequence includes a plurality of position markers arranged in order, a first position marker to a last position marker in the position marker sequence respectively record whether a first sequence number to a last sequence number in a position sequence number sequence are marked, the position sequence number sequence includes the sequence numbers of the plurality of intermediate network devices and a sequence number of a pseudo device, the sequence numbers of the plurality of intermediate network devices are arranged in the position sequence number sequence in an order of the plurality of intermediate network devices on a path in a direction from the control device to the verification device, and the position marker sequence records that the sequence number of the pseudo device is marked; and obtain an accumulated value of the sequence number of the pseudo device and a verification value based on the position sequence number sequence.

The sending unit 302 is configured to send a data packet to a network device, where the network device is a first intermediate network device of the plurality of intermediate network devices on the path in the direction from the control device to the verification device, a packet header of the data packet includes the sequence number marker sequence, the position marker sequence, the accumulated value of the sequence number of the pseudo device, and the verification value, and the verification value is used by the verification device to perform path verification.

Optionally, the sequence numbers in the available sequence number sequence are arranged in ascending order, the verification value is obtained by encrypting a complete-sequence-number accumulated value, and the processing unit 301 obtains the accumulated value of the sequence number of the pseudo device and the complete-sequence-number accumulated value based on the position sequence number sequence using the following formulas.

$$c = \left(\sum_{i=1}^{n-1} p_i \times (n-i)!\right) \% \mu;$$

$$p_i = \sum_{j=i+1}^{n} x_j;$$

$$x_j = \begin{cases} 1, s_j < s_i \\ 0, s_j \geq s_i \end{cases}; \text{ and}$$

$$c_f = \left(\sum_{i \in I_f} p_i \times (n-i)!\right) \% \mu,$$

where c is the complete-sequence-number accumulated value, $s_i$ and $s_j$ are respectively a sequence number i and a sequence number j in the position sequence number sequence, n is a length of the position sequence number sequence, $\mu$ is a modulo prime number, $c_f$ is the accumulated value of the sequence number of the pseudo device, and $I_f$ is a set of sorting values of sequence numbers of all pseudo devices in the position sequence number sequence.

Figure 4:
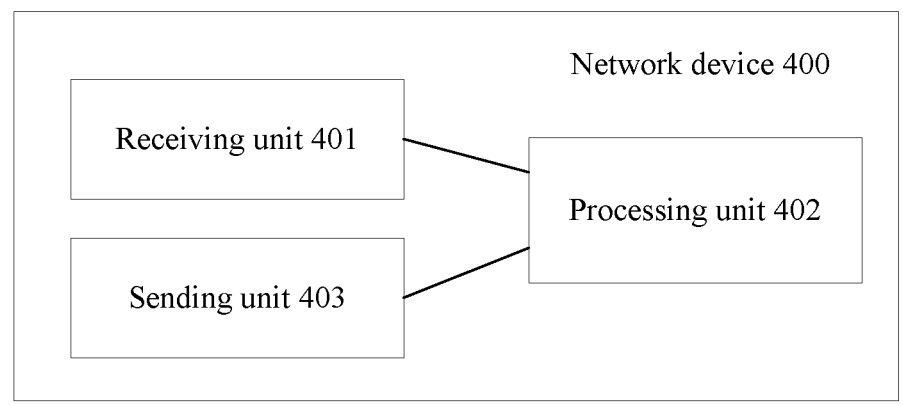
FIG. 4 is a structural diagram of a network device 400 according to an embodiment of this application.

FIG. 4 is a structural diagram of a network device 400 according to an embodiment of this application. The network device 400 may be the intermediate network device 103, 104, or 105 in the method shown in FIG. 2. The network device 400 includes a receiving unit 401, a processing unit 402, and a sending unit 403.

The receiving unit 401 is configured to receive a first data packet sent by a first device, where a packet header of the first data packet includes a first sequence number marker sequence, a first position marker sequence, a first accumulated value, and a verification value, where the first sequence number marker sequence includes a plurality of sequence number markers arranged in order, a first sequence number marker to a last sequence number marker in the first sequence number marker sequence respectively record whether a first sequence number to a last sequence number in an available sequence number sequence are marked, sequence numbers in the available sequence number sequence are arranged in order, and the sequence numbers in the available sequence number sequence include sequence numbers of the plurality of intermediate network devices; the first position marker sequence includes a plurality of position markers arranged in order, a first position marker to a last position marker in the first position marker sequence respectively record whether a first sequence number to a last sequence number in a position sequence number sequence are marked, the position sequence number sequence includes the sequence numbers of the plurality of intermediate network devices and a sequence number of a pseudo device, the sequence numbers of the plurality of intermediate network devices are arranged in the position sequence number sequence in an order of the plurality of intermediate network devices on a path in a sending direction of the first data packet, and the first position marker sequence records that the sequence number of the pseudo device is marked; and the verification value is used by the verification device to perform path verification.

The processing unit 402 is configured to obtain a second data packet, where a packet header of the second data packet includes a second sequence number marker sequence, a second position marker sequence, a second accumulated value, and the verification value, where the second accumulated value is obtained based on the first sequence number marker sequence, the first position marker sequence, and the first accumulated value, the second sequence number marker sequence is obtained by recording, in the first sequence number marker sequence, that a sequence number of the network device is marked, and the second position marker sequence is obtained by recording, in the first position marker sequence, that the sequence number of the network device is marked.

The sending unit 403 is configured to send the second data packet to a second device.

Optionally, the sequence numbers in the available sequence number sequence are arranged in ascending order, and the processing unit 402 obtains the second accumulated value based on the first sequence number marker sequence, the first position marker sequence, and the first accumulated value using the following formula.

$$c_k = (c_m + p \times (n-a)!) \% \mu,$$

where $c_k$ is the second accumulated value, $c_m$ is the first accumulated value, p is a quantity of sequence number markers that are before a current sequence number marker in the first sequence number marker sequence and that record that sequence numbers in the available sequence number sequence are not marked, where the current sequence number marker is a sequence number marker that is in the first sequence number marker sequence and that records whether the sequence number of the network device is marked, n is a length of the first position marker sequence, a is a sorting value of a current position marker in the first position marker sequence, the current position marker is a first position marker that is in the first position marker sequence and that records that a sequence number in the position sequence number sequence is not marked, and $\mu$ is a modulo prime number.

The receiving unit 401 and the sending unit 403 in FIG. 4 may be a same unit, or may be two independent units.

Figure 5:
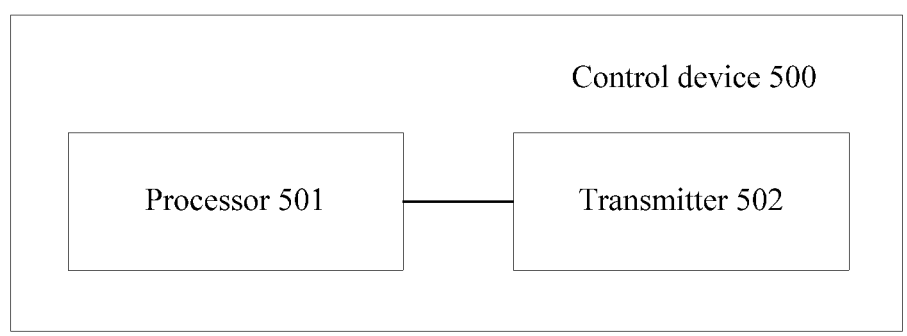
FIG. 5 is a structural diagram of a control device 500 according to an embodiment of this application.

FIG. 5 is a structural diagram of a control device 500 according to an embodiment of this application. The control device 500 may be the control device 102 in the method shown in FIG. 2. The control device 500 includes a processor 501 and a transmitter 502.

The processor 501 is configured to obtain a sequence number marker sequence and a position marker sequence, where the sequence number marker sequence includes a plurality of sequence number markers arranged in order, a first sequence number marker to a last sequence number marker in the sequence number marker sequence respectively record whether a first sequence number to a last sequence number in an available sequence number sequence are marked, sequence numbers in the available sequence number sequence are arranged in order, and the sequence numbers in the available sequence number sequence include sequence numbers of the plurality of intermediate network devices; and the position marker sequence includes a plurality of position markers arranged in order, a first position marker to a last position marker in the position marker sequence respectively record whether a first sequence number to a last sequence number in a position sequence number sequence are marked, the position sequence number sequence includes the sequence numbers of the plurality of intermediate network devices and a sequence number of a pseudo device, the sequence numbers of the plurality of intermediate network devices are arranged in the position sequence number sequence in an order of the plurality of intermediate network devices on a path in a direction from the control device to the verification device, and the position marker sequence records that the sequence number of the pseudo device is marked; and obtain an accumulated value of the sequence number of the pseudo device and a verification value based on the position sequence number sequence.

The transmitter 502 is configured to send a data packet to a network device, where the network device is a first intermediate network device of the plurality of intermediate network devices on the path in the direction from the control device to the verification device, a packet header of the data packet includes the sequence number marker sequence, the position marker sequence, the accumulated value of the sequence number of the pseudo device, and the verification value, and the verification value is used by the verification device to perform path verification.

Optionally, the sequence numbers in the available sequence number sequence are arranged in ascending order, the verification value is obtained by encrypting a complete-sequence-number accumulated value, and the processor 501 obtains the accumulated value of the sequence number of the pseudo device and the complete-sequence-number accumulated value based on the position sequence number sequence using the following formulas.

$$c = \left(\sum_{i=1}^{n-1} p_i \times (n-i)!\right) \% \mu;$$

$$p_i = \sum_{j=i+1}^{n} x_j;$$

$$x_j = \begin{cases} 1, s_j < s_i \\ 0, s_j \geq s_i \end{cases}; \text{ and}$$

$$c_f = \left(\sum_{i \in I_f} p_i \times (n-i)!\right) \% \mu,$$

where c is the complete-sequence-number accumulated value, $s_i$ and $s_j$ are respectively a sequence number i and a sequence number j in the position sequence number sequence, n is a length of the position sequence number sequence, µ is a modulo prime number, $c_f$ is the accumulated value of the sequence number of the pseudo device, and $I_f$ is a set of sorting values of sequence numbers of all pseudo devices in the position sequence number sequence.

Figure 6:
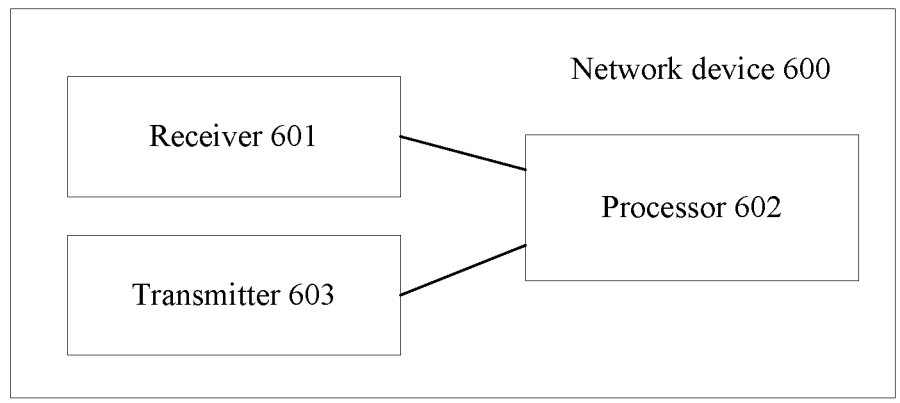
FIG. 6 is a structural diagram of a network device 600 according to an embodiment of this application.

FIG. 6 is a structural diagram of a network device 600 according to an embodiment of this application. The network device 600 may be the intermediate network device 103, 104, or 105 in the method shown in FIG. 2. The network device 600 includes a receiver 601, a processor 602, and a transmitter 603.

The receiver 601 is configured to receive a first data packet sent by a first device, where a packet header of the first data packet includes a first sequence number marker sequence, a first position marker sequence, a first accumulated value, and a verification value, where the first sequence number marker sequence includes a plurality of sequence number markers arranged in order, a first sequence number marker to a last sequence number marker in the first sequence number marker sequence respectively record whether a first sequence number to a last sequence number in an available sequence number sequence are marked, sequence numbers in the available sequence number sequence are arranged in order, and the sequence numbers in the available sequence number sequence include sequence numbers of the plurality of intermediate network devices; the first position marker sequence includes a plurality of position markers arranged in order, a first position marker to a last position marker in the first position marker sequence respectively record whether a first sequence number to a last sequence number in a position sequence number sequence are marked, the position sequence number sequence includes the sequence numbers of the plurality of intermediate network devices and a sequence number of a pseudo device, the sequence numbers of the plurality of intermediate network devices are arranged in the position sequence number sequence in an order of the plurality of intermediate network devices on a path in a sending direction of the first data packet, and the first position marker sequence records that the sequence number of the pseudo device is marked; and the verification value is used by the verification device to perform path verification.

The processor 602 is configured to obtain a second data packet, where a packet header of the second data packet includes a second sequence number marker sequence, a second position marker sequence, a second accumulated value, and the verification value, where the second accumulated value is obtained based on the first sequence number marker sequence, the first position marker sequence, and the first accumulated value, the second sequence number marker sequence is obtained by recording, in the first sequence number marker sequence, that a sequence number of the network device is marked, and the second position marker sequence is obtained by recording, in the first position marker sequence, that the sequence number of the network device is marked.

The transmitter 603 is configured to send the second data packet to a second device.

Optionally, the sequence numbers in the available sequence number sequence are arranged in ascending order, and the processor 602 obtains the second accumulated value based on the first sequence number marker sequence, the first position marker sequence, and the first accumulated value using the following formula.

$$c_k = (c_m + p \times (n-a)!) \% \mu,$$

where $c_k$ is the second accumulated value, $c_m$ is the first accumulated value, p is a quantity of sequence number markers that are before a current sequence number marker in the first sequence number marker sequence and that record that sequence numbers in the available sequence number sequence are not marked, where the current sequence number marker is a sequence number marker that is in the first sequence number marker sequence and that records whether the sequence number of the network device is marked, n is a length of the first position marker sequence, a is a sorting value of a current position marker in the first position marker sequence, the current position marker is a first position marker that is in the first position marker sequence and that records that a sequence number in the position sequence number sequence is not marked, and µ is a modulo prime number.

The processor 501 in FIG. 5 and the processor 602 in FIG. 6 include but are not limited to one or more of a central processing unit (CPU), a network processor (NP), an application-specific integrated circuit (ASIC), or a programmable logic device (PLD). The PLD may be a complex programmable logic device (CPLD), a field-programmable gate array (FPGA), generic array logic (GAL), or any combination thereof.

The transmitter 502 in FIG. 5 and the receiver 601 and the transmitter 603 in FIG. 6 may be wired communications interfaces, wireless communications interfaces, or a combination thereof. The wired communications interface may be, for example, an Ethernet interface, an asynchronous transfer mode (ATM) interface, or a packet over SDH/SONET (POS) interface. The wireless communications interface may be, for example, a wireless local area network (WLAN) interface, a cellular network communications interface, or a combination thereof.

The receiver 601 and the transmitter 603 in FIG. 6 may be a same component, or may be two independent components.

The transmitter 502 in FIG. 5 may communicate with the processor 501 using a bus, or may be directly connected to the processor 501. The receiver 601 and the transmitter 603 in FIG. 6 may communicate with the processor 602 using a bus, or may be directly connected to the processor 602.

Figure 7:
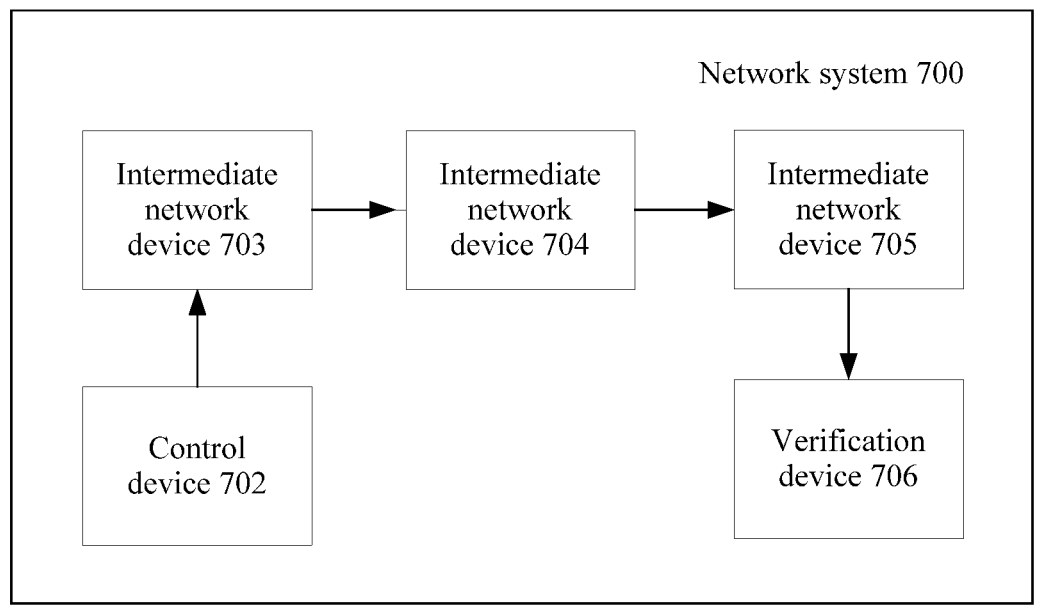
FIG. 7 is a structural diagram of a network system 700 according to an embodiment of this application.

FIG. 7 is a structural diagram of a network system 700 according to an embodiment of this application. The network system 700 includes a control device 702, a verification device 706, and a plurality of intermediate network devices. The plurality of intermediate network devices are two or more intermediate network devices, and an example in which the plurality of intermediate network devices are intermediate network devices 703, 704, and 705 is used in FIG. 7. The control device 702 communicates with the verification device 706 through a path that includes the plurality of intermediate network devices, and a data packet sent by the control device 702 through the path may be used by the verification device 706 to perform path verification. The control device 702 may be the control device 102 shown in FIG. 1, the verification device 706 may be the verification device 106 shown in FIG. 1, and the intermediate network devices 703, 704, and 705 may be respectively the intermediate network devices 103, 104, and 105 shown in FIG. 1. The network system 700 may further include a controller 708, the controller 708 may communicate with the control device 702, the plurality of intermediate network devices, and the verification device 706, and the controller 708 may be the controller 108 shown in FIG. 1.

The control device 702 is configured to (for details, refer to the functions performed by the control device 102 in S201) obtain a first sequence number marker sequence and a first position marker sequence, where the first sequence number marker sequence includes a plurality of sequence number markers arranged in order, a first sequence number marker to a last sequence number marker in the first sequence number marker sequence respectively record whether a first sequence number to a last sequence number in an available sequence number sequence are marked, sequence numbers in the available sequence number sequence are arranged in order, and the sequence numbers in the available sequence number sequence include sequence numbers of the plurality of intermediate network devices; and the first position marker sequence includes a plurality of position markers arranged in order, a first position marker to a last position marker in the first position marker sequence respectively record whether a first sequence number to a last sequence number in a position sequence number sequence are marked, the position sequence number sequence includes the sequence numbers of the plurality of intermediate network devices and a sequence number of a pseudo device, the sequence numbers of the plurality of intermediate network devices are arranged in the position sequence number sequence in an order of the plurality of intermediate network devices on the path in a direction from the control device 702 to the verification device 706, and the first position marker sequence records that the sequence number of the pseudo device is marked; obtain a first accumulated value and a verification value based on the position sequence number sequence; and send a first data packet to a first network device (for example, the intermediate network device 703 in FIG. 7), where the first network device is a first intermediate network device of the plurality of intermediate network devices on the path in the direction from the control device 702 to the verification device 706, and a packet header of the first data packet includes the first sequence number marker sequence, the first position marker sequence, the first accumulated value, and the verification value.

Each (for example, the intermediate network device 703, 704, or 705 in FIG. 7) of the plurality of intermediate network devices is configured to (for details, refer to the functions performed by the intermediate network devices 103, 104, and 105 in S202, S203, and S204) receive a second data packet sent by an upstream device, where the upstream device is a previous device of each intermediate network device on the path in the direction from the control device to the verification device (for example, when each intermediate network device is the intermediate network devices 703, 704, or 705, the upstream device is the control device 702, the intermediate network device 703, or the intermediate network device 704), and a packet header of the second data packet includes a second sequence number marker sequence, a second position marker sequence, a second accumulated value, and the verification value, where the second sequence number marker sequence includes a plurality of sequence number markers arranged in order, and a first sequence number marker to a last sequence number marker in the second sequence number marker sequence respectively record whether the first sequence number to the last sequence number in the available sequence number sequence are marked; and the second position marker sequence includes a plurality of position markers arranged in order, and a first position marker to a last position marker in the second position marker sequence respectively record whether the first sequence number to the last sequence number in the position sequence number sequence are marked; obtain a third data packet, where a packet header of the third data packet includes a third sequence number marker sequence, a third position marker sequence, a third accumulated value, and the verification value, where the third accumulated value is obtained based on the second sequence number marker sequence, the second position marker sequence, and the second accumulated value, the third sequence number marker sequence is obtained by recording, in the second sequence number marker sequence, that a sequence number of each intermediate network device is marked, and the third position marker sequence is obtained by recording, in the second position marker sequence, that the sequence number of each intermediate network device is marked (for example, when each intermediate network device is the intermediate network devices 703, 704, or 705, assuming that sequence numbers of the intermediate network devices 703, 704, and 705 are respectively 2, 3, and 1, the third sequence number marker sequence is obtained by respectively recording, in the second sequence number marker sequence, that the sequence numbers 2, 3, and 1 are marked, and the third position marker sequence is obtained by respectively recording, in the second position marker sequence, that the sequence numbers 2, 3, and 1 are marked); and send the third data packet to a downstream device, where the downstream device is a next device of each intermediate network device on the path in the direction from the control device to the verification device (for example, when each intermediate network device is the intermediate network devices 703, 704, or 705, the downstream device is the intermediate network device 704, the intermediate network device 705, or the verification device 706).

The verification device 706 is configured to (for details, refer to the functions performed by the verification device 106 in S205) receive a fourth data packet sent by a second network device (for example, the intermediate network device 705 in FIG. 7), where the second network device is a last intermediate network device of the plurality of intermediate network devices on the path in the direction from the control device 702 to the verification device 706, and a packet header of the fourth data packet includes a fourth accumulated value and the verification value; and perform path verification based on the fourth accumulated value and the verification value.

Optionally, the sequence numbers in the available sequence number sequence are arranged in ascending order, the verification value is obtained by encrypting a complete-sequence-number accumulated value, and the control device 702 obtains the first accumulated value and the complete-sequence-number accumulated value based on the position sequence number sequence using the following formulas.

$$c = \left(\sum_{i=1}^{n-1} p_i \times (n-i)!\right) \% \mu;$$

$$p_i = \sum_{j=i+1}^{n} x_j;$$

$$x_j = \begin{cases} 1, s_j < s_i \\ 0, s_j \geq s_i \end{cases}; \text{ and}$$

$$c_f = \left(\sum_{i \in I_f} p_i \times (n-i)!\right) \% \mu,$$

where $c$ is the complete-sequence-number accumulated value, $s_i$ and $s_j$ are respectively a sequence number i and a sequence number j in the position sequence number sequence, n is a length of the position sequence number sequence, $\mu$ is a modulo prime number, $c_f$ is the first accumulated value, and $I_f$ is a set of sorting values of sequence numbers of all pseudo devices in the position sequence number sequence; each intermediate network device obtains the third accumulated value based on the second sequence number marker sequence, the second position marker sequence, and the second accumulated value using the following formula.

$$c_k=(c_m+p\times(n-a)!)5\mu$$

where $c_k$ is the third accumulated value, $c_m$ is the second accumulated value, p is a quantity of sequence number markers that are before a current sequence number marker in the second sequence number marker sequence and that record that sequence numbers in the available sequence number sequence are not marked, where the current sequence number marker is a sequence number marker that is in the second sequence number marker sequence and that records whether the sequence number of each intermediate network device is marked, and a is a sorting value of a current position marker in the second position marker sequence, where the current position marker is a first position marker that is in the second position marker sequence and that records that a sequence number in the position sequence number sequence is not marked; and the performing path verification based on the fourth accumulated value and the verification value (for details, refer to the functions performed by the verification device 106 in S205) includes determining whether a decryption value obtained by decrypting the verification value is equal to the fourth accumulated value, or determining whether an encryption value obtained by encrypting the fourth accumulated value is equal to the verification value.

A person skilled in the art should understand that the embodiments of this application may be provided as a method, an apparatus (device), or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a Compact Disc Read-Only Memory (CD-ROM), an optical memory, and the like) that include computer usable program code. The computer program is stored/distributed in a proper medium and is provided as or used as a part of the hardware together with another hardware, or may also use another allocation form, such as using the Internet or another wired or wireless telecommunications system.

This application is described with reference to the flowcharts and/or block diagrams of the method, the apparatus (device), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

The embodiments in this specification are all described in a progressive manner, for same or similar parts in the embodiments, refer to these embodiments, and each embodiment focuses on a difference from other embodiments. Especially, apparatus and system embodiments are basically similar to a method embodiment, and therefore are described briefly; for related parts, refer to partial descriptions in the method embodiment.

It should be understood that sequence numbers of the foregoing method do not mean execution sequences in various embodiments of this application. The execution sequences of the method should be determined according to functions and internal logic of the processes, and should not be construed as any limitation on the implementation processes of the embodiments of this application.

What is claimed is:

1. A data packet sending method implemented by a network device, wherein the network device is one of a plurality of intermediate network devices on a path, and wherein the data packet sending method comprises:

receiving a first data packet from a first device, wherein a first packet header of the first data packet comprises:
a first sequence number marker sequence, wherein the first sequence number marker sequence comprises a plurality of sequence number markers arranged in order, wherein a first sequence number marker in the first sequence number marker sequence to a last sequence number marker in the first sequence number marker sequence respectively record whether a first sequence number to a last sequence number in an available sequence number sequence are marked, wherein a first plurality of sequence numbers in the available sequence number sequence is arranged in order, and wherein the first plurality of sequence numbers comprises a second plurality of sequence numbers of the intermediate network devices;
a first position marker sequence, wherein the first position marker sequence comprises a plurality of position markers arranged in order, wherein a first position marker in the first position marker sequence to a last position marker in the first position marker sequence respectively record whether a first sequence number in a position sequence number sequence to a last sequence number in the position sequence number sequence are marked, wherein a particular position marker in the first position marker sequence is marked when an initial value of the particular position marker is changed to a second value, wherein the position sequence number sequence comprises the second plurality of sequence numbers and a second sequence number of a pseudo device, wherein the second plurality of sequence numbers is arranged in the position sequence number sequence in an order of the intermediate network devices on the path in a sending direction of the first data packet, and wherein the first position marker sequence records that the second sequence number is marked;

a first accumulated value; and a verification value, wherein the verification value enables a verification device to perform path verification;

obtaining a second data packet after the receiving, wherein a second packet header of the second data packet comprises a second sequence number marker sequence, a second position marker sequence, a second accumulated value, and the verification value; and sending the second data packet to a second device.

2. The data packet sending method of claim 1, wherein the first plurality of sequence numbers is arranged in ascending order, and wherein the data packet sending method further comprises obtaining the second accumulated value based on the first sequence number marker sequence, the first position marker sequence, and the first accumulated value using the following formula:

$$c_k=(c_m+p\times(n-a)!)\%\mu,$$

wherein $c_k$ is the second accumulated value, wherein $c_m$ is the first accumulated value, wherein p is a quantity of sequence number markers that are before a current sequence number marker in the first sequence number marker sequence and that record sequence numbers in the available sequence number sequence that are not marked, wherein the current sequence number marker is in the first sequence number marker sequence and records whether a third sequence number of the network device is marked, wherein n is a length of the first position marker sequence, wherein a is a sorting value of a current position marker in the first position marker sequence, wherein the current position marker is a first position marker that is in the first position marker sequence and that records a fourth sequence number in the position sequence number sequence that is not marked, and wherein $\mu$ is a modulo prime number.

3. The data packet sending method of claim 1, further comprising obtaining the second sequence number marker sequence by recording, in the first sequence number marker sequence, that a third sequence number of the network device is marked.

4. The data packet sending method of claim 3, further comprising obtaining the second position marker sequence by recording, in the first position marker sequence, that the third sequence number is marked.

5. The data packet sending method of claim 1, further comprising sending the first data packet to the verification device for path verification after receiving the first data packet.

6. The data packet sending method of claim 1, further comprising obtaining the second accumulated value based on the first sequence number marker sequence, the first position marker sequence, and the first accumulated value.

7. A network device, wherein the network device is one of a plurality of intermediate network devices on a path, a data packet is used by a verification device to perform path verification after being transferred through the path, and wherein the network device comprises:

a non-transitory memory storing instructions; and a processor coupled to the non-transitory memory and configured to execute the instructions to cause the network device to:

receive a first data packet from a first device, wherein a first packet header of the first data packet comprises:

a first sequence number marker sequence, wherein the first sequence number marker sequence comprises a plurality of sequence number markers arranged in order, wherein a first sequence number marker in the first sequence number marker sequence to a last sequence number marker in the first sequence number marker sequence respectively record whether a first sequence number to a last sequence number in an available sequence number sequence are marked, wherein a first plurality of sequence numbers in the available sequence number sequence is arranged in order, and wherein the first plurality of sequence numbers comprises a second plurality of sequence numbers of the intermediate network devices;

a first position marker sequence, wherein the first position marker sequence comprises a plurality of position markers arranged in order, wherein a first position marker to a last position marker in the first position marker sequence respectively record whether a first sequence number to a last sequence number in a position sequence number sequence are marked, wherein a particular position marker in the first position marker sequence is marked when an initial value of the particular position marker is changed to a second value, wherein the position sequence number sequence comprises the second plurality of sequence numbers and a second sequence number of a pseudo device, wherein the second plurality of sequence numbers is arranged in the position sequence number sequence in an order of the intermediate network devices on the path in a sending direction of the first data packet, and wherein the first position marker sequence records that the second sequence number is marked;

a first accumulated value; and a verification value, wherein the verification value enables the verification device to perform path verification;

obtain a second data packet, wherein a second packet header of the second data packet comprises a second sequence number marker sequence;

obtain each of a second position marker sequence, a second accumulated value, and the verification value; and send the second data packet to a second device.

8. The network device of claim 7, wherein the first plurality of sequence numbers is arranged in ascending order, and wherein the instructions further cause the network device to obtain the second accumulated value based on the first sequence number marker sequence, the first position marker sequence, and the first accumulated value using the following formula:

$$c_k=(c_m+p\times(n-a)!)\%\mu,$$

wherein $c_k$ is the second accumulated value, wherein $c_m$ is the first accumulated value, wherein p is a quantity of sequence number markers that are before a current sequence number marker in the first sequence number marker sequence and that record sequence numbers in the available sequence number sequence that are not marked, wherein the current sequence number marker is in the first sequence number marker sequence and records whether a third sequence number of the network device is marked, wherein n is a length of the first position marker sequence, wherein a is a sorting value of a current position marker in the first position marker sequence, wherein the current position marker is a first position marker that is in the first position marker sequence and that records a fourth sequence number in the position sequence number sequence that is not marked, and wherein μ is a modulo prime number.

9. The network device of claim 7, wherein the instructions further cause the network device to obtain the second sequence number marker sequence by recording, in the first sequence number marker sequence, that a third sequence number of the network device is marked.

10. The network device of claim 9, wherein the instructions further cause the network device to obtain the second position marker sequence by recording, in the first position marker sequence, that the third sequence number of the network device is marked.

11. The network device of claim 7, wherein the instructions further cause the network device to obtain the second accumulated value based on the first sequence number marker sequence, the first position marker sequence, and the first accumulated value.

12. A control device, wherein the control device is configured to communicate with a verification device through a path, and wherein the control device comprises:
a non-transitory memory storing instructions; and
a processor coupled to the non-transitory memory and configured to execute the instructions to cause the control device to:
obtain a sequence number marker sequence, wherein the sequence number marker sequence comprises a plurality of sequence number markers arranged in order, wherein a first sequence number marker in the sequence number marker sequence to a last sequence number marker in the sequence number marker sequence respectively record whether a first sequence number in an available sequence number sequence to a last sequence number in the available sequence number sequence are marked, wherein a first plurality of sequence numbers in the available sequence number sequence is arranged in order, and wherein the first plurality of sequence numbers comprises a second plurality of sequence numbers of a plurality of intermediate network devices;
obtain a position marker sequence, wherein the position marker sequence comprises a plurality of position markers arranged in order, wherein a first position marker in the position marker sequence to a last position marker in the position marker sequence respectively record whether a first sequence number in a position sequence number sequence to a last sequence number in the position sequence number sequence are marked, wherein a particular position marker in the position marker sequence is marked when an initial value of the particular position marker is changed to a second value, wherein the position sequence number sequence comprises the second plurality of sequence numbers and a second sequence number of a pseudo device, wherein the second plurality of sequence numbers is arranged in the position sequence number sequence in an order of the intermediate network devices on the path in a direction from the control device to the verification device, and wherein the position marker sequence records that the second sequence number is marked;
obtain an accumulated value of the second sequence number and a verification value based on the position sequence number sequence; and
send a data packet to a network device, wherein the network device is a first intermediate network device of the intermediate network devices on the path in the direction from the control device to the verification device, wherein a packet header of the data packet comprises the sequence number marker sequence, the position marker sequence, the accumulated value of the second sequence number, and the verification value, and wherein the verification value enables the verification device to perform path verification.

13. The control device of claim 12, wherein the first plurality of sequence numbers is arranged in ascending order, and wherein the instructions further cause the control device to:
obtain the verification value by encrypting a complete-sequence-number accumulated value; and
obtain the accumulated value of the second sequence number and the complete-sequence-number accumulated value based on the position sequence number sequence using the following formulas:

$$c = \left(\sum_{i=1}^{n-1} p_i \times (n-i)!\right) \% \mu;$$

$$p_i = \sum_{j=i+1}^{n} x_j;$$

$$x_j = \begin{cases} 1, s_j < s_i \\ 0, s_j \geq s_i \end{cases}; \text{ and}$$

$$c_f = \left(\sum_{i \in I_f} p_i \times (n-i)!\right) \% \mu,$$

wherein c is the complete-sequence-number accumulated value, wherein $s_i$ and $s_j$ are respectively a sequence number i and a sequence number j in the position sequence number sequence, wherein n is a length of the position sequence number sequence, wherein μ is a modulo prime number, wherein $c_f$ is the accumulated value of the second sequence number, and wherein $I_f$ is a set of sorting values of sequence numbers of all pseudo devices in the position sequence number sequence.

14. A network system, comprising:
a plurality of intermediate network devices comprising a first network device;
a verification device coupled to the intermediate network devices; and
a control device configured to:
communicate with the verification device through a path;
obtain a first sequence number marker sequence, wherein the first sequence number marker sequence comprises a plurality of sequence number markers arranged in order, wherein a first sequence number marker in the first sequence number marker sequence to a last sequence number marker in the first sequence number marker sequence respectively record whether a first sequence number in an available sequence number sequence to a last sequence number in the available sequence number sequence are marked, wherein a first plurality of sequence numbers in the available sequence number sequence is arranged in order, and wherein the first plurality of sequence numbers comprises a second plurality of sequence numbers of the intermediate network devices;

obtain a first position marker sequence, wherein the first position marker sequence comprises a plurality of position markers arranged in order, wherein a first position marker in the first position marker sequence to a last position marker in the first position marker sequence respectively record whether a first sequence number in a position sequence number sequence to a last sequence number in the position sequence number sequence are marked, wherein a particular position marker in the first position marker sequence is marked when an initial value of the particular position marker is changed to a second value, wherein the position sequence number sequence comprises the second plurality of sequence numbers and a second sequence number of a pseudo device, wherein the second plurality of sequence numbers is arranged in the position sequence number sequence in an order of the intermediate network devices on the path in a direction from the control device to the verification device, and wherein the first position marker sequence records that the second sequence number is marked;

obtain a first accumulated value and a verification value based on the position sequence number sequence; and send a first data packet to the first network device, wherein the first network device is a first intermediate network device of the intermediate network devices in the direction from the control device to the verification device, wherein a packet header of the first data packet comprises the first sequence number marker sequence, the first position marker sequence, the first accumulated value, and the verification value, and wherein each of the intermediate network devices is configured to:

receive a second data packet from an upstream device that is a previous device of each of the intermediate network devices on the path in the direction from the control device to the verification device, wherein a packet header of the second data packet comprises:
  a second sequence number marker sequence, wherein the second sequence number marker sequence comprises a plurality of sequence number markers arranged in order, and wherein a first sequence number marker in the second sequence number marker sequence to a last sequence number marker in the second sequence number marker sequence respectively record whether the first sequence number in the available sequence number sequence to the last sequence number in the available sequence number sequence are marked;
  a second position marker sequence, wherein the second position marker sequence comprises a plurality of position markers arranged in order, and wherein a first position marker to a last position marker in the second position marker sequence respectively record whether the first sequence number to the last sequence number in the position sequence number sequence are marked;
  a second accumulated value; and
  the verification value;

obtain a third data packet, wherein a packet header of the third data packet comprises:
  a third sequence number marker sequence obtained by recording, in the second sequence number marker sequence, that a sequence number of each of the intermediate network devices is marked;
  a third position marker sequence obtained by recording, in the second position marker sequence, that the sequence number of each intermediate network device is marked;
  a third accumulated value, wherein the third accumulated value is based on the second sequence number marker sequence, the second position marker sequence, and the second accumulated value; and
  the verification value; and send the third data packet to a downstream device, wherein the downstream device is an immediately adjacent device of each of the intermediate network devices on the path in the direction from the control device to the verification device, and wherein the verification device is configured to:
  receive a fourth data packet from a second network device, wherein the second network device is a last intermediate network device of the intermediate network devices on the path in the direction from the control device to the verification device, and wherein a packet header of the fourth data packet comprises a fourth accumulated value and the verification value; and
  perform path verification based on the fourth accumulated value and the verification value.

15. The network system of claim 14, wherein the first plurality of sequence numbers is arranged in ascending order, and wherein the control device is configured to:
obtain the verification value by encrypting a complete-sequence-number accumulated value;
obtain the first accumulated value and the complete-sequence-number accumulated value based on the position sequence number sequence using the following formulas:

$$c = \left(\sum_{i=1}^{n-1} p_i \times (n-i)!\right) \% \ \mu;$$

$$p_i = \sum_{j=i+1}^{n} x_j;$$

$$x_j = \begin{cases} 1, s_j < s_i \\ 0, s_j \geq s_i \end{cases}; \text{ and}$$

$$c_f = \left(\sum_{i \in I_f} p_i \times (n-i)!\right) \% \ \mu,$$

wherein c is the complete-sequence-number accumulated value, wherein $s_i$ and $s_j$ are respectively a sequence number i and a sequence number j in the position sequence number sequence, wherein n is a length of the position sequence number sequence, wherein $\mu$ is a modulo prime number, wherein $c_f$ is the first accumulated value, wherein $I_f$ is a set of sorting values of sequence numbers of all pseudo devices in the position sequence number sequence, and wherein each of the intermediate network devices obtains the third accumulated value based on the second sequence number marker sequence, the second position marker sequence, and the second accumulated value using the following formula:

$$c_k = (c_m + p \times (n-a)!) \% \mu,$$

wherein $c_k$ is the third accumulated value, wherein $c_m$ is the second accumulated value, wherein $\mu$ is a quantity of sequence number markers that are before a current sequence number marker in the second sequence number marker sequence and that record the first plurality of sequence numbers that are not marked, wherein the current sequence number marker is a sequence number marker that is in the second sequence number marker sequence and that records whether the sequence number of each of the intermediate network devices is marked, wherein a is a sorting value of a current position marker in the second position marker sequence, and wherein the current position marker is a first position marker in the second position marker sequence that records that a sequence number in the position sequence number sequence is not marked; and perform the path verification based on the fourth accumulated value and the verification value based on either a decryption value or an encryption value.

16. The network system of claim 15, wherein the control device is configured to perform the path verification by determining whether the decryption value is equal to the fourth accumulated value.

17. The network system of claim 15, wherein the control device is configured to perform the path verification by determining whether the encryption value is equal to the verification value.

18. The network system of claim 15, wherein the control device is configured to obtain the decryption value by decrypting the verification value.

19. The network system of claim 18, wherein the control device is configured to obtain the encryption value by encrypting the fourth accumulated value.

* * * * *

UNITED STATES PATENT AND TRADEMARK OFFICE
CERTIFICATE OF CORRECTION

| | |
|---|---|
| PATENT NO. | : 11,405,407 B2 |
| APPLICATION NO. | : 16/692616 |
| DATED | : August 2, 2022 |
| INVENTOR(S) | : Qian Xiao et al. |

It is certified that error appears in the above-identified patent and that said Letters Patent is hereby corrected as shown below:

In the Claims

Claim 15, Column 37, Line 6: "wherein $\mu$ is a quantity" should read "wherein p is a quantity"

Signed and Sealed this
Twenty-seventh Day of September, 2022

Katherine Kelly Vidal
Director of the United States Patent and Trademark Office